US006971697B2

(12) United States Patent
Morales

(10) Patent No.: US 6,971,697 B2
(45) Date of Patent: Dec. 6, 2005

(54) LINER-DISPENSING TRASH RECEPTACLE ASSEMBLY FOR USE IN COMBINATION WITH A MOTOR VEHICLE

(76) Inventor: Kimberly A. Morales, 4020 University, Gurnee, IL (US) 60031

( * ) Notice: Subject to any disclaimer, the term of this patent is extended or adjusted under 35 U.S.C. 154(b) by 0 days.

(21) Appl. No.: 10/676,927

(22) Filed: Sep. 30, 2003

(65) Prior Publication Data

US 2005/0067850 A1  Mar. 31, 2005

(51) Int. Cl.⁷ .............................. B60R 7/04; B65F 1/06
(52) U.S. Cl. ................. 296/37.1; 296/37.8; 296/37.15; 296/37.12; 220/495.07; 220/908; 224/275
(58) Field of Search .............................. 296/37.1, 37.8, 296/37.15, 37.16, 37.12, 70; 220/908, 908.1, 220/909, 495.01, 495.07; 248/907; 224/275, 224/928

(56) References Cited

U.S. PATENT DOCUMENTS

| D180,199 S | 4/1957 | Perreault |
| 3,088,771 A | 5/1963 | Weigle |
| 3,337,282 A | 8/1967 | Groff et al. |
| 3,690,446 A * | 9/1972 | EShour et al. .............. 206/525 |
| 4,087,126 A | 5/1978 | Wynn |
| 4,223,858 A | 9/1980 | de Salazar |
| 4,319,694 A | 3/1982 | Nehrbass et al. |
| 4,364,490 A | 12/1982 | Lang et al. |
| 4,757,928 A * | 7/1988 | Browne ....................... 224/275 |
| 4,796,791 A | 1/1989 | Goss et al. |
| 4,798,363 A | 1/1989 | Cortesi |
| 4,809,897 A | 3/1989 | Wright, Jr. |
| 4,869,391 A | 9/1989 | Farrington |
| 4,955,505 A | 9/1990 | Battaglia |
| 5,105,969 A | 4/1992 | Lamas |
| 5,115,935 A | 5/1992 | Lemongelli |
| 5,129,609 A | 7/1992 | Tobin |
| D335,559 S | 5/1993 | Land |
| 5,226,576 A * | 7/1993 | Ellsworth ................... 224/572 |
| 5,246,190 A | 9/1993 | Swirkal |
| 5,282,556 A | 2/1994 | Bossert |
| 5,322,179 A * | 6/1994 | Ting ...................... 220/495.07 |
| 5,322,180 A | 6/1994 | Ker |
| 5,363,980 A | 11/1994 | Mulcashy |
| 5,405,041 A | 4/1995 | Van Brackle |
| 5,458,259 A | 10/1995 | Falk |
| 5,505,334 A | 4/1996 | Triglia |
| 5,551,616 A | 9/1996 | Stitt et al. |
| 5,628,424 A * | 5/1997 | Gola ...................... 220/495.07 |

(Continued)

Primary Examiner—Dennis H. Pedder
Assistant Examiner—Greg Blankenship
(74) Attorney, Agent, or Firm—Meroni & Meroni; Christopher J. Scott; Charles F. Meroni, Jr.

(57) ABSTRACT

The present invention provides a liner-dispensing trash receptacle system for use in combination with a motor vehicle. The liner-dispensing trash receptacle system essentially comprises a trash-receiving container, a liner-dispensing assembly, and a liner roll. The trash-receiving container essentially comprises a container bottom, a container rim, an inner container surface, and an outer container surface. The inner container surface essentially defines a superior matter-receiving volume and the outer container surface is cooperatively associated with a container-engaging surface. The liner-dispensing assembly comprises first and second laterally spaced rod-retaining members, first and second anchor structures, and a liner-retaining rod. The liner roll essentially comprises a continuously-furled liner length and a rod-receiving center. The rod-receiving center receives the liner-retaining rod and the container rim supports a roll beginning end of the first trash-receiving liner.

47 Claims, 7 Drawing Sheets

U.S. PATENT DOCUMENTS

| | | | |
|---|---|---|---|
| 5,671,847 A | 9/1997 | Pedersen et al. | |
| 5,704,511 A * | 1/1998 | Kellams | 220/495.07 |
| 5,730,312 A * | 3/1998 | Hung | 229/117.35 |
| 5,738,239 A | 4/1998 | Triglia | |
| 5,743,585 A | 4/1998 | Pranger et al. | |
| 5,803,325 A | 9/1998 | Wang | |
| 5,881,900 A * | 3/1999 | Meshorer | 220/495.07 |
| 5,887,834 A * | 3/1999 | Gellos et al. | 248/156 |
| 5,909,832 A | 6/1999 | French et al. | |
| 5,938,094 A | 8/1999 | Forhan et al. | |
| 5,947,295 A | 9/1999 | Lutin | |
| 6,068,221 A | 5/2000 | Rosen | |
| 6,098,933 A | 8/2000 | Stein | |
| 6,105,859 A | 8/2000 | Stafford | |
| 6,126,031 A * | 10/2000 | Reason | 220/495.07 |
| 6,131,861 A | 10/2000 | Fortier, Jr. et al. | |
| 6,193,095 B1 | 2/2001 | McNeil | |
| 6,223,927 B1 * | 5/2001 | Rand | 220/495.06 |
| 6,234,339 B1 * | 5/2001 | Thomas | 220/495.07 |
| 6,283,321 B1 * | 9/2001 | Meshorer | 220/495.07 |
| 6,283,405 B1 | 9/2001 | Tracy | |
| 6,435,587 B1 | 8/2002 | Flowerday et al. | |
| 6,616,109 B1 * | 9/2003 | Jarrett et al. | 248/201 |
| 6,629,622 B1 * | 10/2003 | Abzaletdinov | 220/495.07 |

* cited by examiner

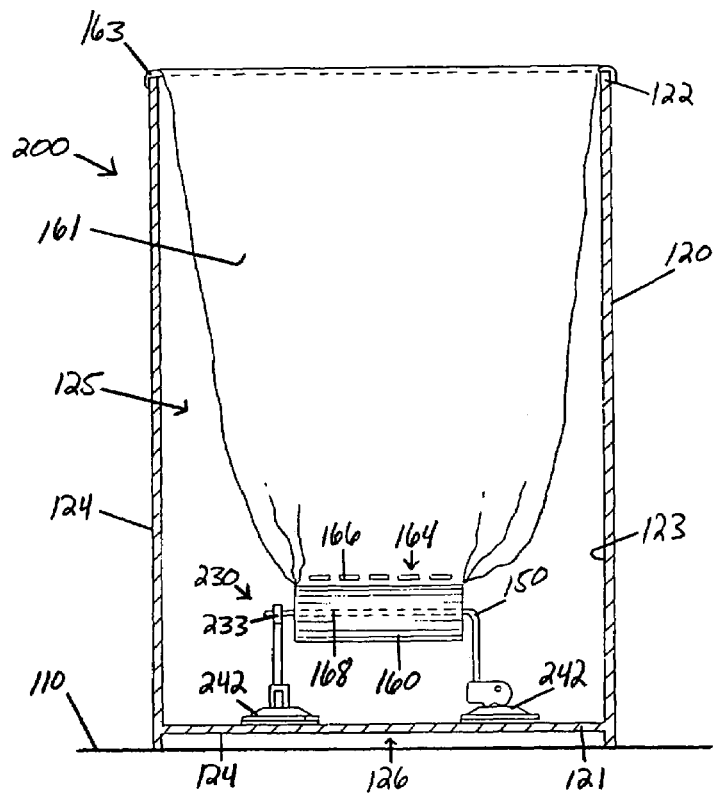
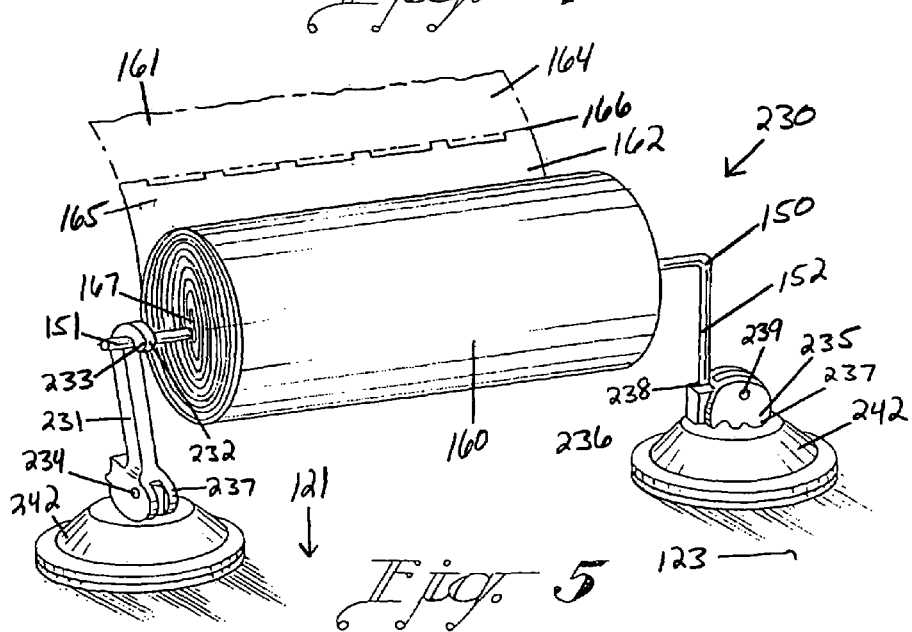

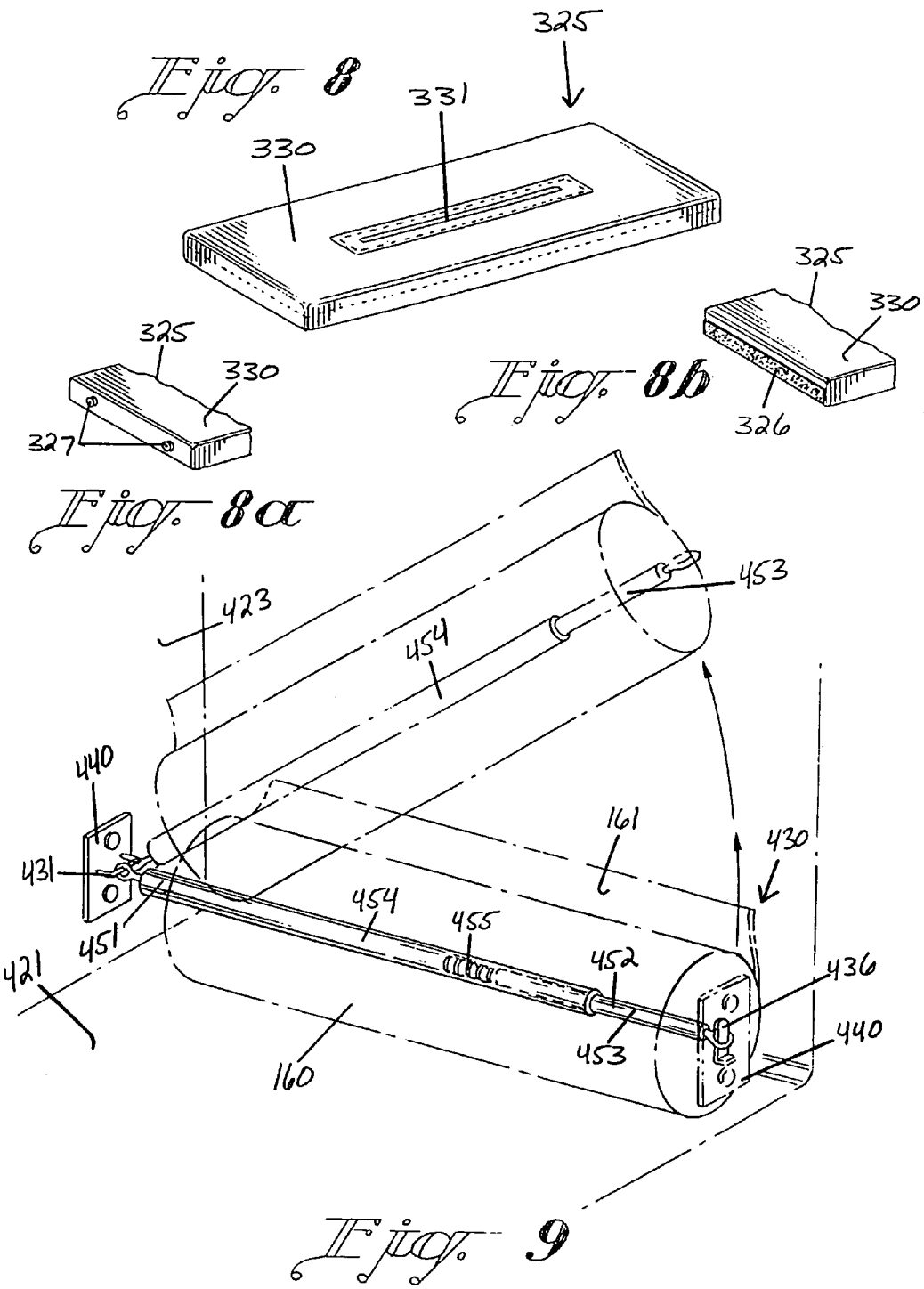

continued

LINER-DISPENSING TRASH RECEPTACLE ASSEMBLY FOR USE IN COMBINATION WITH A MOTOR VEHICLE

BACKGROUND OF THE INVENTION

1. Field of the Invention

The present invention generally relates to a liner-dispensing trash receptacle assembly or system. More particularly, the present invention relates a vehicular-based trash receptacle system, which receptacle system comprises a liner-dispensing assembly for dispensing a continuously-furled liner length having a plurality of perforated zones intermediate successively queued trash-receiving liners. The present invention thus provides users with a means to collect and dispose of vehicle generated or accumulated trash.

2. Description of the Prior Art

As a means to increase modern conveniences for families having a plurality of members, motor vehicle manufacturers have developed, marketed and sold family oriented motor vehicles. Purchasers of these vehicles, however, often contend with vehicular shortcomings when it comes to discarding trash produced or accumulated in the so-called "family vehicle." Moreover, trash-receiving containers, in particular, or trash receptacle systems, in general, have typically suffered from further shortcomings insofar as many of the available trash receptacle systems provide largely inconvenient means for replacing trash-receiving liners in the trash-receiving containers. In an attempt to remedy the noted shortcomings, inventors have developed a number of various vehicular-based trash receptacles as well as a number of various continuous liner-dispensing trash receptacle systems. Thus, the prior art teaches a variety of means for collecting and stowing trash that is produced or accumulated in motor vehicles. Further, the prior teaches a variety of trash receptacle assemblies designed for providing a more convenient means of replacing trash-receiving liners in trash-receiving containers. Some of the more pertinent prior art relating to liner-dispensing systems as well as vehicular-based trash receptacle systems is described hereinafter.

U.S. Pat. No. 4,319,694 ('694 patent), which issued to Nehrbass et al., discloses a Refuse Receptacle with Renewable Liners. The '694 patent teaches a refuse receptacle wherein the bottom wall of the refuse receptacle contains a bin which opens therethrough into the interior of the receptacle to receive a roll of separably-connected bag-type liners. The bin opening is closed by a removable cover which seats flush with the receptacle bottom wall and has a slot through which the liners are dispensed into the interior of the receptacle. The cover also has tabs along two opposite sides frictionally catch beneath the bottom wall of the receptacle to removably receive the cover in place.

U.S. Pat. No. 4,798,363 ('363 patent), which issued to Cortesi, discloses a Container with Lining Bag Dispenser. The '363 patent teaches a wastebasket with a roll of liner bags below the bottom of the wastebasket. The bags are fed through a slot in the bottom to permit replacement of a first bag with a succeeding bag in the roll. When a full bag is removed from the container, the succeeding bag is automatically pulled in to the enclosure, and it may be removed by simply tearing at a perforated line. The '363 patent further teaches in relevant portion a spindle, upon which the roll of bags may be placed.

U.S. Pat. No. 4,869,391 ('391 patent), which issued to Farrington, discloses a Plastic Liner Dispensing System. The '391 patent teaches a combination of a waste container and a stack of disposable plastic liners for use therein, each liner containing a cardboard insert. The inserts are dimensioned so as to frictionally engage the interior wall surface at or near the bottom of the tapered container and wedge the liners against the container. This frictional engagement prevents the stack of liners from spilling as the container is moved about. In a second embodiment, the '391 patent teaches in relevant portion, a combination of a waste container and a roll of liners, whereby the liners are held in place by a dowel from with holes in each end thereof and fitted for retention by holders. The liners are rolled in such a way so as allow a hollow core for receiving the dowel.

U.S. Pat. No. 4,955,505 ('505 patent), which issued to Battaglia, discloses a Trash Receptacle Lining System. The '505 patent teaches a trash receptacle lining system which utilizes a roll of perforated plastic trash bags mounted for rotation on a transverse spindle. In a first embodiment, the spindle may be provided on an originally constructed trash receptacle having an open top and bottom ends separated by a transverse slotted partition. The spindle mounts the trash bag roll below the partition and the free end of the trash bag roll is received through the slotted partition into the upper portion of the receptacle. This allows a new trash bag liner to be conveniently installed upon removal of a filled trash bag.

U.S. Pat. No. 5,505,334 ('334 patent), which issued to Triglia, discloses a Trash Container Liner Dispensing System. The '334 patent teaches a storage rod for temporarily supporting liners for a container mounted by one end of the rod to the bottom side of a wall having a slot for passing the liners through the wall from the bottom side to the top side of the wall. The attachment to the wall supports the rod with the other end of the rod unsupported for receiving the liners. The end of the rod receiving the liners is unobstructed, for access to the rod coaxially with the rod by a roll of liners for sliding them on the rod. A handle is at one end of the slot and generally normal to the slot to avoid uncontrolled twist of an operator's fingers when handling the assembly.

U.S. Pat. No. 6,234,339 ('339 patent), which issued to Thomas, discloses a Trash Can with Liner Dispenser. The '339 patent teaches a trash can with liner dispenser for storing trash can liners therein. The '339 device includes a base with the top of the base having an opening therethrough-with a plurality of slits outwardly radiating from the periphery of the opening. The perimeter side of the base has an annular lip extending therearound which defines a shoulder. The open lower end of a side wall is rested on shoulder of the base. The side wall has an elongate cutout extending through the inner and outer surfaces of the side wall. In relevant portion, the '339 patent further teaches the use of a roller structure for holding a roll of bag liners to ease the dispensing mechanism.

U.S. Pat. No. 3,337,282 ('282 patent), which issued to Groff et al., discloses an Automobile Litter Box. The '282 patent teaches a litter box for use in an automobile or the like, which can be manually pulled or automatically driven from a concealed storage position to an extended use position. When automatically driven, an electric motor is mechanically coupled to the box through rollers for frictionally driving it between the storage and use positions.

U.S. Pat. No. 4,087,126 ('126 patent), which issued to Wynn, discloses a Console for Van-Type Vehicles. The '126 patent teaches a console which approximates the contour of the shroud over the portion of an automobile engine extending rearwardly into the cab of a van-type truck. The console provides convenience accessories, such as liquid container holders, trash bins, and ashtrays and a safe compartment in which electronic devices, such as radios and tape players, may be stored.

U.S. Pat. No. 4,796,791 ('791 patent), which issued to Goss et al., discloses a Console for a Vehicle. The '791 patent teaches a vehicle console comprising a base unit that will hold drinks, store a removable trash receptacle, and contain an additional storage area for various articles. The device of the '791 patent further comprises a leveling mechanism and drink holding gripping devices therein.

U.S. Pat. No. 5,551,616 ('616 patent), which issued to Stitt et al., discloses a Portable Vehicle Organizing Container. The '616 patent teaches a universal vehicle organizing container for automobiles and trucks which sits on the right of the driver and contains specialized surfaces for holding items necessary for a traveling businessman, such as laptop computer, cellular phone, and more. The container is secured to the seat back by means of a strap which can also act as a carrying means. The inside of the container is insulated and partitioned, so that items may be carried securely and food items will stay hot or cold longer. The container is connected by dual wires to the vehicles cigarette lighter socket and multiple cigarette lighter type adapters are located on the top surface of the container to power electronic devices.

U.S. Pat. No. 5,743,585 ('585 patent), which issued to Pranger et al., discloses a Truck Cab Console with Integral Trash Container. The '585 patent teaches a trash container apparatus integrally mounted with a truck cab console. A pivotable trash door is positioned on the cab console to allow access to the inside of the trash container for disposing trash therein. The inner sides of the trash container have protrusions to retain the top edge of a trash bag so that the bag lines the container and is capable of receiving trash. The trash container is movable from a closed position to an open position. In the open position, the container is positioned in the area substantially in front of the passenger seat to allow access to the inside of the container for removing any accumulated trash. Slide rails attached to the container are capable of sliding along guide tracks attached to the cab console for moving the container from a closed to an open position, or vice versa. The trash container has a handle for grasping when being removed.

U.S. Pat. No. 6,435,587 ('587 patent), which issued to Flowerday et al., discloses a Console. The '587 patent teaches a console, which comprises a housing with a central storage area selectively enclosed by first and second sliding tray assemblies which move from a closed position adjacent one another to an open position distal from one another for gaining access to the central storage area. The console may include a removable storage bag which can be fitted under the sliding trays and removed from the console for carrying to a remote location. The sliding tray assemblies include storage systems, such as a storage/trash bin, cup holders, and the like and include a positive latching system to prevent inadvertent movement of the trays.

U.S. Pat. No. 3,088,771 ('771 patent), which issued to Weigle, discloses an Automobile Seat Litter Receiving Device. The '771 patent teaches a housing structure including a back-frame recessedly secured with a recess within the rear of an automobile seat, a front-plate, and an open-topped insert member removably receivable with the housing structure, the front plate being arranged to swing to a closed position flush with the respect to the rear surface of the automobile seat and means to retain the front-plate in closed position.

U.S. Pat. No. 5,226,576 ('576 patent), which issued to Ellsworth, discloses a Vehicle Trash Container. The '576 patent teaches a waste receptacle with an outer container having foldable sidewalls, a rectangular bottom and an inner means for supporting and securing a disposable bag liner. The liner is preferably a recycled plastic grocery bag.

U.S. Pat. No. 5,353,950 ('950 patent), which issued to Taylor et al., discloses a Collapsible Trash Bag Dispenser for Dispensing Trash Bags from the Bottom of a Trash Container. The '950 patent teaches a flexible, collapsible trash bag dispenser attached to the bottom of a trash can be an adhesive tape. The trash bags are connected in a string and stored in the dispenser with the last bag being connected to the pouch. The trash bags are pulled out one at a time, and expanded in the container. When the expanded trash bag is full of trash, it is removed from the container, pulling up the next bag to replace the full trash bag. The process continues until the last bag, which is marked, indicates the end of the string of bags. The last trash bag is attached to the pouch so that they can be removed together when the last trash bag is full. The flexible pouch is collapsed as trash is delivered to the bag.

U.S. Pat. No. 6,068,221 ('221 patent), which issued to Rosen, discloses a Folding Rubbish Bag Holder. The '221 patent teaches a folding rubbish bag holder for us in a car, which comprises a base member having a projecting edge, a lid and an elongated connecting member hingedly connected t the base member and to the lid. The bag holder further includes a support frame having an opening for receiving a trash bag therethrough and is hingedly connected to the base member such that the support frame is disposed along said base member and a use position wherein said support frame is pivoted substantially perpendicularly from said base member. The support frame includes at least one stop lug projecting from a top surface of the support frame and a lifting member pivotably connected to the lid for lifting the lid from the support frame and has at least one support arm for engaging at least one stop plug on the support frame when the support frame is in the use-position. A clamping shoulder disposed at the support frame holds the support frame in the use position by engaging the projecting edge of the base member.

U.S. Pat. No. 2,118,380 ('380 patent), which issued to Gresenz, discloses a Package for Sheet Material. The '380 patent teaches sheet material packages for interfolded sheets such as cleansing tissue sheets. The main object of the '380 patent is to provide a package, having a relatively deep configuration, from which interfolded sheets may be withdrawn one at a time and which will afford convenient access to the sheets to facilitate withdrawal thereof, especially when the bottom of the stack of sheets is being approached. U.S. Pat. Nos. 3,012,692, 3,144,961 and 3,272,385 also teach the use of interfolded sheets and dispenser boxes therefore.

U.S. Pat. No. 3,392,825 ('825 patent), which issued to Gale et al., discloses a Continuous Bag System. The '825 patent teaches a continuous bag system provided from a continuous plastic tubular section wherein the tubular section includes a folding process with means provided between adjacent bags to permit separation of one bag from the continuous line of bags provided and wherein the folding process includes a pleating or interfolding arrangement to pleat transversely of the continuous section to provide a compact bag section to be housed within an integrated container for the bags.

U.S. Pat. No. 4,044,919 ('919 patent), which issued to Olson, discloses a Thermoplastic Bag Dispensing Assembly.

The '919 patent teaches a carton and an assembly of individual bags packaged therein. The carton is provided with an elongated slot which is located along an upper edge of the carton whereby individual bags may be dispensed from the carton one at a time. The bags are so arranged within the carton and the carton slot is so positioned that, upon withdrawal of each bag, the closure flap adjacent the bag mouth will be withdrawn first from the carton, making the open-bag mouth initially accessible for product insertion. In relevant portion, the bags are positioned or folded about a resilient insert in such a manner that when a single bag is withdrawn through an orifice in the dispenser carton, the bag will always be oriented with its open mouth end emerging first from the orifice so as to facilitate rapid loading of product into the bag.

U.S. Pat. No. 4,349,123 ('123 patent), which issued to Yang, discloses a Garbage Can with a Packaged and Folded Plastic Bags Supplier. The '123 patent teaches a garbage can with a packaged and folded plastic bags supplier, characterized in using a series of plastic bags which are packaged and folded in a box as a supplier for continuously supplying available plastic bags, relates to the structure of a garbage can and the special manner or sealing and folding the plastic bags as well.

U.S. Pat. No. 4,721,226 ('226 patent), which issued to Yurko, discloses a Waste Container Bag Dispenser Combination. The '226 patent teaches a waste container structured to receive and retain a commercially distributable bag dispenser box from a side opening in the bottom of the container. The bag dispenser box that is contemplated to be used in combination with this waste container is rectangular in shape and contains a plurality of flatly folded bags, each of which are retrievable from a top slot. When in position in the waste container, the bag dispenser box is prevented from being lifted as each bag is pulled from the box by inwardly extending projections provided on the inside of the waste container.

U.S. Pat. No. 4,850,507 ('507 patent), which issued to Lemongelli et al., discloses a Trash Container with Disposable Bags. U.S. Pat. No. 5,183,157 ('157 patent), which issued to Darden, discloses a Plastic Bag Dispensing System. Both the '507 patent and the '157 patent teach the use of folded bags for use in combination with a trash receptacle, which folded bags are successively dispensed as bags are used and discarded.

From a review of these patents and other prior art generally known in the relevant art, it will be seen that the prior art does not teach a low cost, vehicular-based, continuous liner-dispensing, trash-receiving receptacle system wherein the vehicular-based, continuous liner-dispensing, trash-receiving receptacle system comprises in combination certain essential structures of a motor vehicle and a liner-dispensing trash receptacle system. Further, in this last regard, it will be seen that the prior art does not teach the combination of a motor vehicle and liner-dispensing trash receptacle system where in the motor vehicle comprises a container-receiving or enclosing surface and a liner-dispensing trash receptacle system for fixed or removable engagement with the container-receiving or container-enclosing surface. Still further, it will be further seen that the prior art does not teach a liner-dispensing trash receptacle system for use in combination with a motor vehicle that comprises a trash-receiving container, a liner-dispensing assembly, and a liner roll.

The prior art thus perceives a need for a low cost, vehicular-based, continuous liner-dispensing, trash-receiving receptacle system wherein the vehicular-based, continuous liner-dispensing, trash-receiving receptacle system comprises in combination certain essential structures typically found in a motor vehicle and a liner-dispensing trash receptacle system. In this last regard, the prior art perceives a need for motor vehicle having a container-receiving or container-enclosing surface, and a liner-dispensing trash receptacle system for fixed or removable engagement with the container-receiving or container-enclosing surface. Further, the prior art perceives a need for a liner-dispensing trash receptacle system for use in combination with a motor vehicle that comprises a trash-receiving container, a liner-dispensing assembly, and a liner roll.

SUMMARY OF THE INVENTION

Accordingly, it is an object of the present invention to provide a low cost, vehicular-based, continuous liner-dispensing, trash-receiving receptacle system wherein the vehicular-based, continuous liner-dispensing, trash-receiving receptacle system comprises in combination a motor vehicle and a liner-dispensing trash receptacle system. It is a further object of the present invention to provide, in combination, a motor vehicle having a container-receiving or container-enclosing surface and a liner-dispensing trash receptacle system for fixed or removable engagement with the container-receiving or container-enclosing surface. Further, it is an object of the present invention to provide a liner-dispensing trash receptacle system for use in combination with a motor vehicle, which assembly essentially comprises a trash-receiving container, a liner-dispensing assembly, and a liner roll.

To achieve these and other readily apparent objectives, the present invention provides a liner-dispensing trash receptacle system for use in combination with a motor vehicle. More particularly, the present invention provides a liner-dispensing trash receptacle system for engagement with a vehicular container-engaging or container-enclosing surface. In this last regard, the present invention provides a motor vehicle comprising a container-engaging surface, at least one vehicular seat, and a select vehicular compartment selected from the group consisting of a vehicular dashboard console, a vehicular seat-based console, and a vehicular stowage compartment generally located at the inner periphery of a vehicle.

Further, the present invention provides a liner-dispensing trash receptacle system comprising a trash-receiving container, a liner-dispensing assembly, and a liner roll. The trash-receiving container essentially comprises a container bottom, a container rim, an inner container surface, and an outer container surface. The inner container surface essentially defines a superior matter-receiving volume and the outer container surface is cooperatively associated with a container-engaging surface or more particularly, defines an inferior matter-receiving volume primarily designed for fixed or removable engagement with vehicular container-engaging surface.

The liner-dispensing assembly comprises first and second laterally spaced rod-retaining members, first and second anchor structures, and a liner-retaining rod. In the most preferred embodiment, it will be seen that the liner-retaining rod is preferably L-shaped. The first and second rod-retaining members each comprise a superior rod-receiving end and an inferior anchor-engaging end. The superior rod-receiving ends each comprise rod-receiving means. The inferior anchor-engaging ends are each pivotally connected to the first and second anchor structures in the preferred embodiment.

The first and second anchor structures each comprise container-fastening means, which function to anchor the first and second anchor structures to the inner container surface. The liner-retaining rod comprises first and second rod ends; which first and second rod ends are selectively received by the rod-receiving means. It is contemplated that the container-fastening means for anchoring the first and second anchor structures to the inner container surface may preferably be defined by a select fastening structure, the select fastening structure being selected from the group consisting of a nut and bolt fastening assembly, a hook and loop fastening assembly, and a suction cup fastening assembly.

The liner roll essentially comprises a continuously-furled liner length and a rod-receiving center. The continuously-furled liner length preferably comprises a plurality of perforated zones intermediate each successively queued trash-receiving liner. The rod-receiving center receives the liner-retaining rod and the container rim supports a roll beginning end of the first trash-receiving liner. The liner-retaining rod is spatially located in the trash-receiving container so as to allow the liner roll to turn upon the liner-retaining rod about an axis extending through the rod-receiving center. The trash-receiving container, the liner-dispensing assembly and the liner roll thus form a liner-dispensing trash receptacle system for cooperative association with the container-engaging surface.

Other objects of the present invention, as well as particular features, elements, and advantages thereof, will be elucidated in, or apparent from, the following description and the accompanying drawing figures.

BRIEF DESCRIPTION OF THE DRAWINGS

Other features of my invention will become more evident from a consideration of the following brief description of patent drawings, as follows:

FIG. 4 is a cross sectional side view of a first alternative embodiment of the liner-dispensing trash receptacle system.

FIG. 5 is a perspective view of an alternative liner-dispensing assembly engaged with a liner roll.

FIG. 8 is a perspective view of the volume-dividing member as depicted in FIG. 7.

FIG. 8(a) is a fragmentary perspective view of the volume-dividing member of FIG. 8 depicting a first type of divider attachment means.

FIG. 8(b) is a fragmentary perspective view of the volume-dividing member of FIG. 8 depicting a second type of divider attachment means.

FIG. 9 is perspective view of a third alternative embodiment of a liner-dispensing assembly with a phantom liner roll depicting the third alternative embodiment of the liner-dispensing assembly with phantom liner roll pivoted adjacent a select container wall.

DETAILED DESCRIPTION OF THE PREFERRED EMBODIMENT

Figure 1:
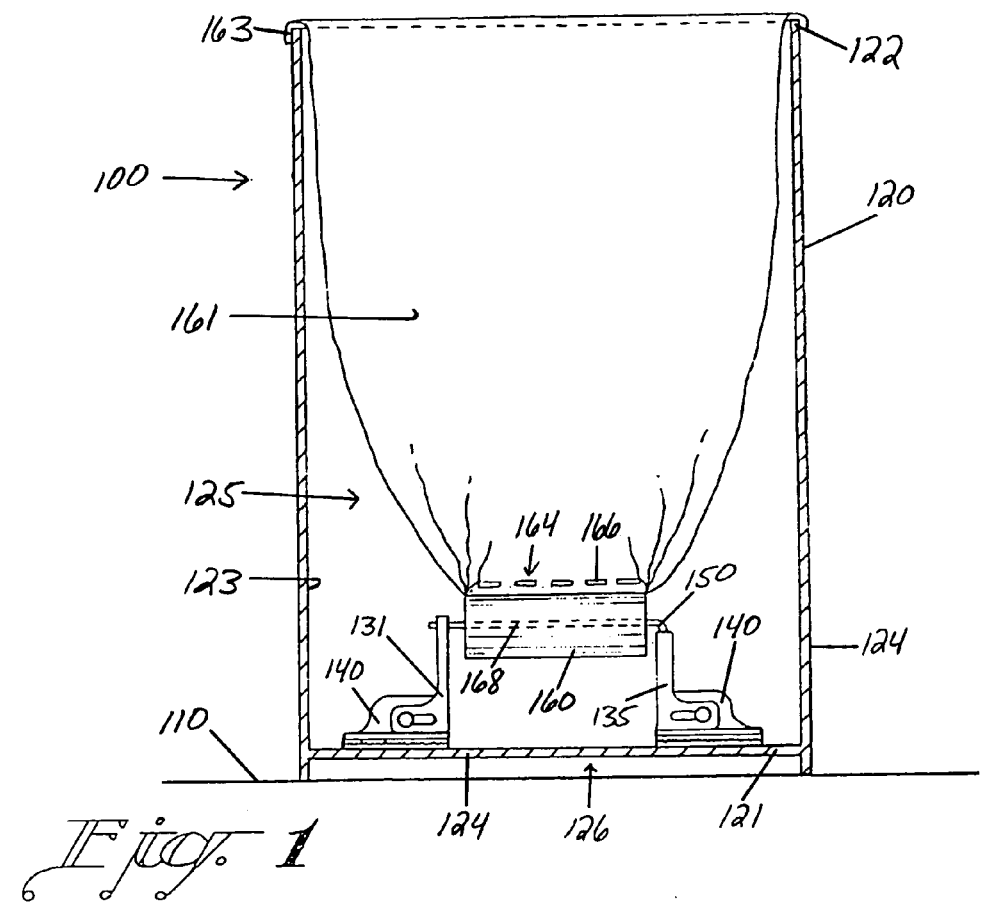
FIG. 1 is a cross sectional side view of the preferred embodiment of the liner-dispensing trash receptacle system.

Referring now to the drawings, the preferred embodiment of the present invention generally concerns a liner-dispensing trash receptacle system for cooperative association with a container-engaging surface. More particularly, the preferred embodiment of the present invention concerns a vehicular-based, liner-dispensing trash receptacle system 100 as generally illustrated in FIG. 1. Vehicular-based liner-dispensing trash receptacle system 100 is primarily designed for use in combination with a motor vehicle. The present invention thus contemplates a novel combination wherein the combination comprises liner-dispensing trash receptacle system 100 and a motor vehicle. The motor vehicle essentially comprises a vehicular container-engaging surface for receiving and stowing the liner-dispensing trash receptacle system. In this last regard, liner-dispensing trash receptacle system 100 is designed for either fixed or removable attachment to a vehicular container-engaging surface 110, which vehicular container-engaging surface 110 is generally illustrated in FIGS. 1 and 4. It is contemplated that users of the present invention may elect to permanently install liner-dispensing trash receptacle system 100 in their motor vehicle to serve as a permanent trash receptacle for trash produced or accumulated in the motor vehicle.

As has been noted, it is contemplated that many users of the present invention may have large families comprising children. As is well known to caretakers of children, the presence of children in a given family vehicle often results in the accumulation of large amounts of trash in the family vehicle. In this regard, users having large families may be desirous of having a fixed trash receptacle as embodied or described by the present invention in the family vehicle. Alternatively, the user may elect to temporarily install liner-dispensing trash receptacle system 100 in his or her motor vehicle for vacation trips and the like during which trips trash is likely to accumulate. In any event, it is thus contemplated vehicular-based liner-dispensing trash receptacle system 100 is designed for generally fixed or removable engagement with a vehicular container-engaging surface 110 as generally illustrated in FIG. 1.

Liner-dispensing trash receptacle system 100 preferably comprises a trash-receiving container 120 as illustrated in FIGS. 1 and 4; a liner-dispensing assembly 130 as generally illustrated in FIG. 1; and a liner roll 160 as generally illustrated in FIGS. 1, 3–5, 9–11, and 14. Trash-receiving container 120 is preferably formed or constructed from a semi-rigid material such as durable plastic and comprises a container bottom 121 as illustrated in FIGS. 1–5; a container rim 122 as illustrated in FIGS. 1 and 4; an inner container surface 123 as illustrated in FIGS. 1–5; and an outer container surface 124 as illustrated in FIGS. 1 and 4. As will be seen from an inspection FIGS. 1 and 4, inner container surface 123 defines a superior matter-receiving volume 125 and outer container surface 124 is primarily designed for cooperative association with a container-engaging surface. More particularly, outer container surface 124 defines an inferior matter-receiving volume 126 at or adjacent container bottom 121.

Inferior matter-receiving volume 126 is primarily designed for fixed or removable engagement with vehicular container-engaging surface 110 and may thus be preferably defined by an assembly-receiving cavity at container bottom 121. In this last regard, it is contemplated that vehicular container-engaging surface 110 may comprise a container-engaging volume (not illustrated) that essentially coincides with matter-receiving volume 126 or assembly-receiving cavity, which cavity is described in more detail below. In other words, the given motor vehicle may comprise a male container-engaging volume insertable into matter-receiving volume 126 so as to provide a more stable foundation upon which to place, position or install trash-receiving container 120. It is noted, that motor vehicle manufacturers may not be desirous of forming a container-engaging volume at any given vehicular container-engaging surface 110 and thus the present invention is illustrated as being placed atop vehicular-engaging surface 110 where vehicular-engaging surface is essentially planar in configuration.

Figures 2, 3:
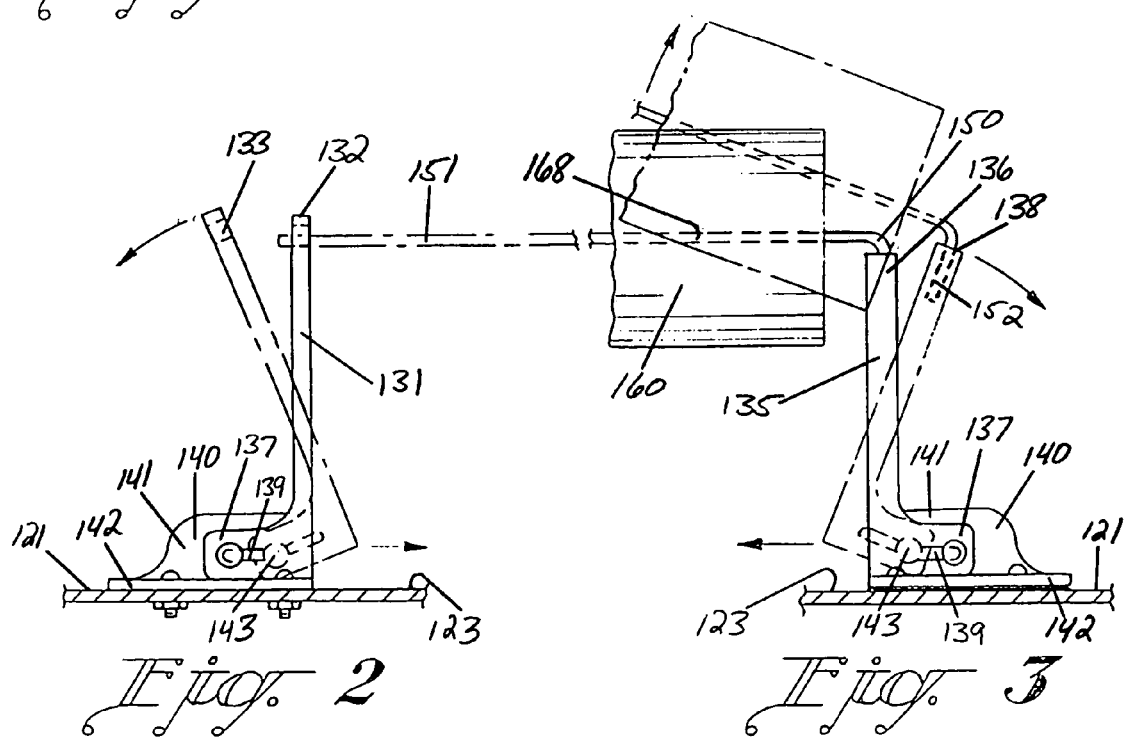
FIG. 2 is a fragmentary side view of the preferred embodiment of the liner-dispensing assembly depicting a pivoted first rod-retaining member.
FIG. 3 is a fragmentary side view of the preferred embodiment of the liner-dispensing assembly depicting a pivoted second rod-retaining member engaged with a liner roll.

Liner-dispensing assembly 130 preferably comprises first and second laterally spaced rod-retaining members as generally illustrated in FIGS. 1–3; first and second anchor structures 140 as illustrated in FIGS. 1–3; and a liner-retaining rod 150 as illustrated in FIGS. 1–5. In the most preferred embodiment, it will be seen that liner-retaining rod 150 is preferably L-shaped. The first rod-retaining member is referenced at 131 and the second rod-retaining member is referenced at 135. First and second rod-retaining members 131 and 135 are preferably formed from a durable rigid material such as steel or other durable metal and are each generally L-shaped as can be seen from an inspection of FIGS. 1–3. First rod-retaining member 131 comprises a first superior rod-receiving end as referenced at 132 in FIG. 2, and second rod-retaining member 135 comprises a second superior rod-receiving end as referenced at 136 in FIG. 3. First and second rod-retaining members 131 and 135 each further preferably comprise an inferior anchor-engaging end 137 as illustrated in FIGS. 2 and 3.

It will be seen that first and second superior rod-receiving ends 132 and 136 generally comprise rod-receiving means. More particularly, first superior rod-receiving end 132 preferably comprises a horizontally-aligned rod-receiving aperture 133 as illustrated in FIG. 2 and second superior rod-receiving end 136 preferably comprises a vertically-aligned rod-receiving aperture 138 as illustrated in FIG. 3. Inferior anchor-engaging ends 137 each further preferably comprise a pin-engaging slot 139 as illustrated in FIGS. 2 and 3. It will be understood from an inspection of FIGS. 2 and 3 that each pin-engaging slot 139 has a medial slot end and a lateral slot end. The medial slot end is spatially located toward the medial axis of trash-receiving container 110 or toward the body of liner roll 160 and the lateral slot end is spatially located toward inner container surface 123.

First and second anchor structures 140 are each preferably formed or constructed from a rigid durable material such as steel or other durable metal and preferably comprise a vertical pin-retaining structure 141 and a horizontal container-engaging structure 142 as illustrated in FIGS. 2 and 3. Vertical pin-retaining structures 141 each preferably comprise a laterally-extending pivot pin as referenced at 143. Each laterally-extending pivot pin preferably further comprises a pin cap, which pin caps retain rod-retaining members 131 and 135 in adjacency to vertical pin-retaining structures 141.

Horizontal container-engaging structures 142 each preferably comprise container-fastening means for anchoring first and second anchor structures 140 to inner container surface 123 at container bottom 121. It is contemplated that the container-fastening means for anchoring first and second anchor structures 140 to container bottom 121 may preferably be defined by a select fastening structure, the select fastening structure being selected from the group consisting of a nut and bolt fastening assembly, a hook and loop fastening assembly, and a suction cup fastening assembly. It is believed within the ordinary skill of persons in the pertinent art to affix first and second anchor structures 140 to container bottom 121 utilizing either a nut and bolt assemblage, a hook and loop fastening assemblage, or a suction cup fastening assemblage.

For illustrative purposes, however, the reader is directed to FIG. 2, where the reader will see that first anchor structure 140 is affixed to container bottom 121 utilizing a nut and bolt assemblage where two bolts are illustrated extending through bolt-receiving apertures (not shown) in horizontal container-engaging structure 142 and container bottom 121 and fastened by two nuts, respectively. It will thus be understood that the nut and bolt fastening assembly may be defined by anchoring-engaging superior structure (the bolt head or cap) and container-engaging inferior structure (the nut-receiving ends of the bolts and the respective nuts). It should be noted that if the manufacturer elects to utilize a nut and bolt assembly as described, inferior matter-receiving volume 126 is preferably defined by an assembly-receiving cavity at the container bottom, which assembly-receiving cavity was earlier mentioned in this description. It is contemplated that the assembly-receiving cavity is designed to receive the container-engaging inferior structure or structures as herein described. Alternatively, it is contemplated that the nut and bolt assembly may fixedly anchor the liner-dispensing trash receptacle system directly to the vehicular container-engaging surface. In this regard, it is contemplated that bolts extend through apertures formed in the vehicular container-engaging surface and respective nuts fasten the nut-receiving bolt ends in inferior adjacency to the vehicular container-engaging surface.

Regarding the hook and loop fastening assembly, the reader is further directed to FIG. 3 for illustrative purposes. There the reader will see that second anchor structure 140 is affixed to container bottom 121 utilizing a hook and loop fastening assemblage. It is contemplated that the hook and loop fastening assembly may preferably be defined by VELCRO brand hook and loop fastening structures. While either the hook or loop fastening structures may be adhesively attached to the inferior surface of horizontal container-engaging structures 142, for removably matable attachment to either loop or hook fastening structures adhesively attached to inner container surface 123 at container bottom 121, it is contemplated that the present invention provides matable superior hook structures and inferior loop structures. In other words, it is contemplated that the superior hook structures are preferably adhesively attached to the inferior surfaces of each horizontal container-engaging structure 142 and the inferior loop structures are preferably adhesively attached to inner container surface 123 at the container bottom 121 opposite horizontal container-engaging structure 142. This structural configuration is preferred insofar as it is contemplated that should the user elect to remove liner-dispensing assembly 130 from container bottom 121, the inferior loop structures will remain adhesively attached to inner container surface 123 at the container bottom 121 in spaced relation. VELCRO loop fastening structure is preferred for adhesive attachment to inner container surface 123 at container bottom 121 insofar as airborne fibers and other loop-like fibrous materials, which occasionally contact exposed VELCRO hook fastening structure, often become embedded in the hook type structure. Once embedded these materials and/or fibers become unsightly and are difficult to remove from the hook type structure. These embedded materials and/or fibers thus detract from the visual appearance of the fastening means when in an exposed unmated state and further decrease the overall effectiveness of the resulting container fastening means. VELCRO brand loop fastening structure tends not to retain fibers or loop-like materials as does VELCRO brand hook fastening structure, and thus is the preferable fastening means for adhesive attachment to inner container surface 123 at container bottom 121.

It is still further contemplated that the manufacturer may elect to utilize a suction cup assemblage as container fastening means. In this regard, inner container surface 123 is preferably smooth at the container bottom, the smooth inner container surface being defined by having a surface free from macroscopic irregularities, roughness or projections. In other words, inner container surface 123 must be sufficiently even so as to be capable of creating an effective vacuum for suction cups. The suction cup assembly thus preferably comprises first and second suction cups, each suction cup comprising an inferior vacuum surface and superior structure attachment means. The superior structure attachment means are fixedly attached to horizontal container-engaging structures 142, the vacuum surfaces thus being designed for removably attaching first and second anchor structures 140 to the smooth or even inner container surface 123 at container bottom 121.

L-shaped liner-retaining rod 150 is preferably formed from a rigid material such as steel or other durable metal and preferably comprises a linear first rod end 151 as illustrated in FIGS. 2 and 5, and an angled second rod end 152 as illustrated in FIGS. 3 and 5. As will be understood from an inspection of FIG. 3, second rod end 152 is preferably fixedly received in vertically-aligned rod-receiving aperture 138. Further, first rod end 151 is primarily designed for removable insertion into horizontally-aligned rod-receiving aperture 133 as generally illustrated in FIGS. 2 and 3.

Liner roll 160 preferably comprises a continuous length of perforated plastic bags or liners and in this regard particularly comprises a first trash-receiving liner 161 as illustrated in FIGS. 1, 4, 5, 9–11, 13, and 14; a plurality of intermediate trash-receiving liners 162, one of which is illustrated in FIG. 5; and a last trash-receiving liner. First trash-receiving liner 161 preferably comprises a roll beginning end 163 as illustrated in FIGS. 1, 4, 10, 11, 13, and 14; and a first liner-engaging end 164 as illustrated in FIGS. 1, 4, and 5. Each intermediate trash-receiving liner comprises an intermediate trash-receiving end 165 as illustrated in FIG. 5, and an intermediate liner-engaging end. The last trash-receiving liner comprises a last trash-receiving end and a roll terminus end. Each intermediate trash-receiving end 165 is removably connected to a liner-engaging end (either first liner-engaging end 164 or a previously queued intermediate liner-engaging end) and each intermediate liner-engaging end is removably connected to a trash-receiving end (either a subsequently queued intermediate trash-receiving end 165 as illustrated in FIG. 5 or the last trash-receiving end). First trash-receiving liner 161, the intermediate trash-receiving liners 162, and the last trash-receiving liner thus cooperatively form a continuously-furled liner length and a rod-receiving center as referenced at 167 in FIGS. 5, 10, and 11. The liner length comprises a plurality of perforated zones as referenced at 166 in FIGS. 1, 4, and 5. The user may thus utilize first trash-receiving liner 161 to accumulate trash therein by supporting roll beginning end 163 on container rim 122 as generally shown in FIGS. 1 and 4.

It will thus be understood from a consideration of the drawings that the last trash-receiving liner forms a rod-receiving tunnel 168 at the rod-receiving center as illustrated in FIGS. 1, 3, and 4. Rod-receiving tunnel 168 receives first rod end 151 and notably comprises a tunnel axis. First rod end 151 is then preferably removably inserted into horizontally-aligned rod-receiving aperture 133 as generally shown in FIG. 2. It will be understood that container rim 122 supports roll beginning end 163, and L-shaped liner-retaining rod 150 is preferably spatially located so as to allow liner roll 160 to turn upon L-shaped liner-retaining rod 150 about the tunnel axis at the rod-receiving center.

When first trash-receiving liner 161 is full of trash or otherwise needs replacement, the user may tear first trash-receiving liner 161 from a successive intermediate trash-receiving liner 162 at the respective perforated zone 166. The successively queued intermediate trash-receiving liner 162 then effectively becomes the first trash-receiving liner 161. This process repeats itself until the last trash-receiving liner becomes the first trash-receiving liner 161. When the last trash-receiving liner becomes the first trash-receiving liner 161 and becomes full of trash or otherwise needs replacement, the user must provide liner-dispensing assembly 130 with a replacement liner roll 160.

It will be noted that laterally-extending pivot pins 143 are spatially located at the lateral slot ends after first rod end 151 is removably inserted into horizontally-aligned rod-receiving aperture 133. When the last trash-receiving liner is utilized and installation of a replacement liner roll 160 is required, the user may slide first rod-retaining member 131 laterally toward inner container surface 123 such that the laterally-extending pivot pin 143 cooperatively associated with first rod-retaining member 131 becomes located at the medial slot end of the respective pin-engaging slot 139 thus effectively removing first rod end 151 from removable insertion in horizontally-aligned rod-receiving aperture 133 and allowing second rod-retaining member 135 and L-shaped liner-retaining rod 150 to rotate or pivot about the laterally-extending pivot pin 143 cooperatively associated with second rod-retaining member 135. By pivoting about the laterally-extending pivot pin 143 (as generally illustrated in FIG. 3), first rod end 151 thus becomes free for receiving a replacement liner roll 160. In this last regard, first rod end 151 is inserted into a replacement rod-receiving tunnel 168 as earlier described and second rod-retaining member 135 and L-shaped liner-retaining rod 150 are return rotated or pivoted about the laterally-extending pivot pin 143 such that rod-receiving tunnel 168 is returned to a substantially horizontal position. First rod-retaining member 131 may then be return slid to its original position whereby rod-receiving aperture 133 again removably accepts first rod end 151.

Alternatively, the user may slide second rod-retaining member 135 laterally toward inner container surface 123 such that the laterally-extending pivot pin 143 cooperatively associated with second rod-retaining member 135 becomes located at the medial slot end of the respective pin-engaging slot 139 thus also effectively removing first rod end 151 from removable insertion in horizontally-aligned rod-receiving aperture 133. This allows first rod-retaining member 131 to pivot about the laterally-extending pivot pin 143 cooperatively associated with first rod-retaining member 131 as generally illustrated in broken lines in FIG. 2. Second rod-retaining member 135 may then be return slid to its original position so as to enable the user to pivot second rod-retaining member 135 about the laterally-extending pivot pin 143 cooperatively associated with second rod-retaining member 135 as generally illustrated in broken lines in FIG. 3, thus freeing first rod end 151 for receiving a replacement liner roll 160 as described above.

Trash-receiving container 120, liner-dispensing assembly 130, and liner roll 160 thus cooperatively form liner-dispensing trash receptacle system 100, which assembly is designed primarily for either removable or fixed attachment or engagement with vehicular container-engaging surface 110 substantially as described.

Alternative Embodiment No. 1

A first alternative embodiment of the present invention generally concerns a vehicular-based, liner-dispensing trash receptacle system 200 as generally illustrated in FIG. 4. Vehicular-based, liner-dispensing trash receptacle system 200 is essentially identical to vehicular-based, liner-dispensing trash receptacle system 100 except for certain structures as identified in the respective liner-dispensing assemblies. It is thus contemplated that the first alternative embodiment as described hereunder also represents an inventive combination of a liner-dispensing trash receptacle system and a motor vehicle, wherein the motor vehicle comprises a vehicular container-engaging surface for receiving and stowing liner-dispensing trash receptacle system 200. A comparison of FIGS. 1–3 inclusive with FIGS. 4 and 5 will teach the reader that liner-dispensing trash receptacle system 200 preferably comprises trash-receiving container 120; a liner-dispensing assembly 230 as generally illustrated in FIGS. 4 and 5; and liner roll 160.

Liner-dispensing assembly 230 preferably comprises first and second laterally spaced rod-retaining members as generally illustrated in FIGS. 4 and 5; assembly anchoring means; and L-shaped liner-retaining rod 150. The first rod-retaining member is referenced at 231 and the second rod-retaining member is referenced at 235. First and second rod-retaining members 231 and 235 are preferably formed from a durable rigid material such as plastic or metal. First rod-retaining member 231 comprises a first superior rod-receiving end 232 as referenced in FIG. 5, and second rod-retaining member 235 comprises a second superior rod-receiving end 236 as also referenced in FIG. 5. First and second rod-retaining members 231 and 235 each preferably comprise an inferior anchor-engaging end 237 as illustrated in FIG. 5.

First superior rod-receiving end 232 comprising a rod-receiving hook 233 as illustrated in FIGS. 4 and 5. Second superior rod-receiving end 236 preferably comprises a vertically-aligned rod-receiving aperture 238 as illustrated in FIG. 5. Inferior anchor-engaging ends 237 each further preferably comprise pivot attachment means preferably defined by first and second pivot pin assemblies. The first pivot pin assembly comprises vertical, longitudinally-aligned pivot pin-retaining structure and horizontally-aligned or horizontal first anchor attachment structure 242. The vertical, longitudinally-aligned pivot pin-retaining structure comprises at least one first pivot pin as referenced at 234 in FIG. 5. The second pivot pin assembly preferably comprises vertical, latitudinally-aligned pivot pin-retaining structure and horizontally-aligned or horizontal second anchor attachment structure 242. The vertical, latitudinally-aligned pivot pin-retaining structure comprises at least one second pivot pin 239 as also referenced in FIG. 5. The pivot attachment means thus enable first rod-retaining member 231 to pivot about a latitudinally-aligned axis extending through first pivot pin 234 and second rod-retaining member 235 to pivot about a longitudinally-aligned axis extending through second pivot pin 238.

Thus, the pivot attachment means are designed so as to enable first rod-retaining member 231 to pivot about a latitudinally-aligned axis and second rod-retaining member 235 to pivot about a longitudinally-aligned axis. The assembly anchoring means are designed so as to anchor first and second rod-retaining members 231 and 235 to inner container surface 123 at container bottom 121. As earlier described, L-shaped liner-retaining rod 150 comprises linear first rod end 151 and angled second rod end 152. Second rod end 152 is preferably fixedly received in vertically-aligned rod-receiving aperture 238. First rod end 151 is thus designed for removable receipt by rod-receiving hook 233.

The assembly anchoring means are preferably defined by horizontal container-engaging structures 242 as illustrated in FIGS. 4 and 5 and each preferably comprise container-fastening means for anchoring first and second rod-retaining members 231 and 235 to inner container surface 123 at container bottom 121. It is contemplated that the container-fastening means for anchoring first and second rod-retaining members 231 and 235 to container bottom 121 may preferably be defined by a select fastening structure, the select fastening structure being selected from the group consisting of a nut and bolt fastening assembly, a hook and loop fastening assembly, and a suction cup fastening assembly. It is believed within the ordinary skill of persons in the pertinent art to affix anchoring first and second rod-retaining members 231 and 235 to container bottom 121 utilizing either a nut and bolt assemblage, a hook and loop fastening assemblage, or a suction cup fastening assemblage.

For illustrative purposes, however, the reader is directed to FIG. 5. There it will be seen that it is contemplated the manufacturer may elect to utilize a suction cup assemblage as container-fastening means. In this regard, inner container surface 123 is preferably smooth at container bottom 121, the smooth inner container surface being defined by having a surface free from macroscopic irregularities, roughness or projections. In other words, inner container surface 123 must be sufficiently even so as to be capable of creating an effective vacuum for suction cups. The suction cup assembly thus preferably comprises first and second suction cups, each suction cup comprising an inferior vacuum surface and superior structure attachment means. The superior structure attachment means may preferably be defined by first and second pivot pin assemblies as earlier described. The superior structure attachment means are fixedly attached to horizontal container-engaging structures 242, the vacuum surfaces thus being designed for removably attaching first and second rod-retaining members 231 and 235 to the smooth or even inner container surface 123 at container bottom 121.

When the last trash-receiving liner becomes the first trash-receiving liner 161 and becomes full of trash or otherwise needs replacement as earlier described, the user must provide liner-dispensing assembly 230 with a replacement liner roll 160. When the last trash-receiving liner is utilized and installation of a replacement liner roll 160 is required, the user may pivot first rod-retaining member 231 about the axis extending through pivot pin 234 thus effectively removing first rod end 151 from removable engagement with rod-receiving hook 233 and allowing second rod-retaining member 235 and L-shaped liner-retaining rod 150 to rotate or pivot about the axis extending through pivot pin 238. By pivoting about the axis extending through pivot pin 238, first rod end 151 thus becomes free for receiving a replacement liner roll 160. In this last regard, first rod end 151 is inserted into a replacement rod-receiving tunnel 168 as earlier described and second rod-retaining member 235 and L-shaped liner-retaining rod 150 are return rotated or pivoted about the axis extending through pivot pin 238 such that rod-receiving tunnel 168 is returned to a substantially horizontal position. First rod-retaining member 231 may then be returned or pivoted to its original position whereby rod-receiving hook 233 again removably accepts first rod end 151.

Trash-receiving container 120, liner-dispensing assembly 230, and liner roll 160 thus cooperatively form liner-dispensing trash receptacle system 200, which assembly is designed primarily for either removable or fixed attachment or engagement with vehicular container-engaging surface 110 substantially as described.

Alternative Embodiment No. 2

Figure 6:
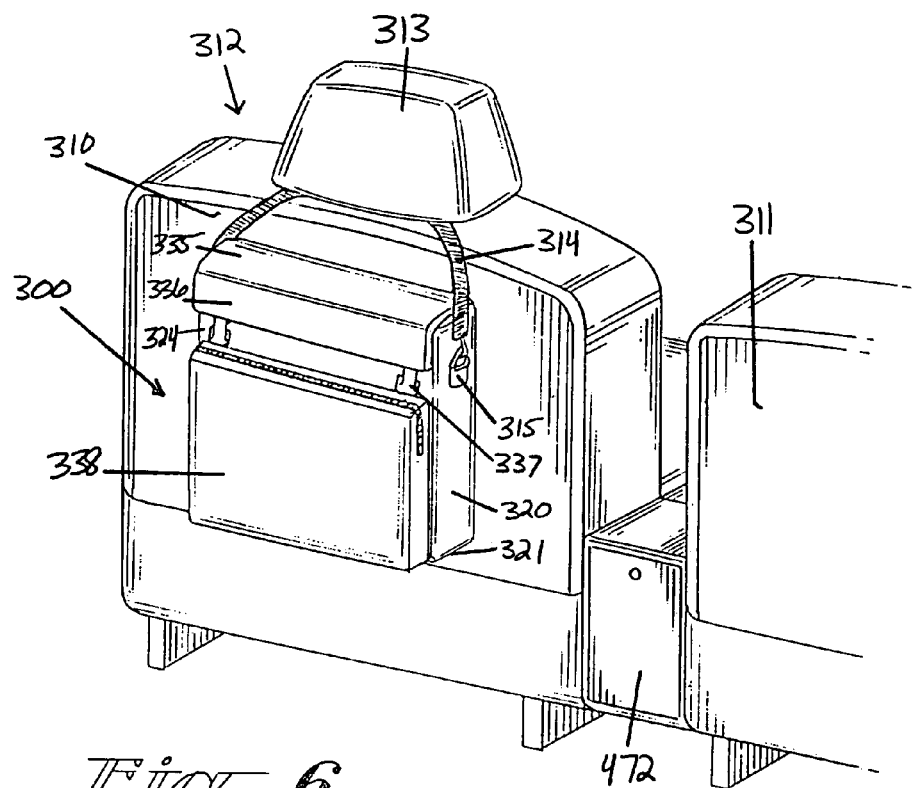
FIG. 6 is a perspective view of a second alternative embodiment of the liner-dispensing trash receptacle system engaged with a vehicular seat.

A second alternative embodiment of the present invention generally concerns a liner-dispensing trash receptacle system for juxtaposition adjacent a substantially vertical container-engaging surface. More particularly, the second alternative embodiment of the present invention concerns a liner-dispensing trash receptacle system 300 for engagement with a substantially vertical container-engaging surface or a substantially vertical, vehicular, container-engaging surface as generally illustrated in FIG. 6. It will be further understood that the second alternative embodiment of the present invention also teaches an inventive combination of a motor vehicle and a liner-dispensing trash receptacle system, wherein the combination comprises a motor vehicle and liner-dispensing trash receptacle system 300. In the second alternative embodiment, however, it is contemplated that the vertical member generally comprises a container-engaging surface and a superior located member. More particularly, it is contemplated that the motor vehicle essentially comprises at least one vehicular seat 312 as illustrated in FIG. 6. Vehicular seat 312, in turn, essentially comprises a headrest 313, an anterior seat surface, and a posterior seat surface 310. Headrest 313 and posterior seat surface 310 have also been illustrated in FIG. 6. Vehicular seat 312 thus serves as vehicular structure for receiving and stowing liner-dispensing trash receptacle system 300. Liner-dispensing trash receptacle system 300 preferably comprises a trash-receiving container 320 as illustrated in FIGS. 6 and 7; vertical member attachment means or seat-engagement means; and a liner roll 360 as illustrated in FIG. 7.

Liner-dispensing trash receptacle system 300 is primarily designed for use in combination with a motor vehicle. In this regard, vehicular-based liner-dispensing trash receptacle system 300 is designed for either fixed or removable attachment to a substantially vertical, vehicular container-engaging surface 310. It is contemplated that the user of the present invention may elect to permanently install liner-dispensing trash receptacle system 300 in his or her motor vehicle to serve as a permanent trash receptacle for trash produced or accumulated in the motor vehicle, particularly those regions of the motor vehicle behind the front seats. Many users have large families and the presence of children often results in the accumulation of large amounts of trash in the family vehicle. Children are often positioned rearward of the front seats in family vehicles and thus it is contemplated that the second alternative embodiment of the present invention is primarily designed for positioned placement adjacent the posterior seat surface 310 of either the driver seat of a motor vehicle as generally illustrated in FIG. 6 or for positioned placement adjacent the posterior surface of the front passenger seat of a motor vehicle as generally referenced at 311 in FIG. 6. Users of the present invention who have large families may be desirous of having a fixed trash receptacle as embodied or described by the present alternative embodiment in the family vehicle. Alternatively, the user may elect to temporarily install liner-dispensing trash receptacle system 300 in his or her motor vehicle for vacation trips and the like during which trips trash is likely to accumulate. In any event, it is thus contemplated liner-dispensing trash receptacle system 300 is designed for generally fixed or removable engagement with a vehicular container-engaging surface 310 as generally illustrated in FIG. 6.

Because liner-dispensing trash receptacle system 300 is primarily designed for engagement with a vehicular container-engaging surface 310, trash-receiving container 320 is preferably formed from an adaptable, pliant material such as nylon or plastic. In this regard, it is contemplated that for safety reasons, liner-dispensing trash receptacle system 300 should be constructed from soft pliant materials as opposed to rigid materials. In the event of a sudden negative vehicular acceleration such as would be experienced in a quick stop or collision, vehicular based passengers who are spatially located rearward of liner-dispensing trash receptacle system 300 would continue in the direction originally traveled until acted upon by a opposing force and thus would very likely travel into liner-dispensing trash receptacle system 300. Vehicular seats are generally designed for safety issues of this type and thus it is contemplated that the second alternative embodiment of the present invention, namely, liner-dispensing trash receptacle system 300 ought not interfere with the safety designs of vehicular seats. It is for reasons such as those here described that trash-receiving container 320 is preferably formed from an adaptable, pliant material, which material will adapt to objects or persons colliding with it. Should the projectile happen to be a person or other living creature, it is thus intended that the present invention not otherwise contribute to injury of the person or creature. To further increase the safety features of the present invention it is further contemplated that trash-receiving container 320 be formed from padded, adaptable pliant material so as to increase collision absorbing properties of trash-receiving container 320.

Figure 7:
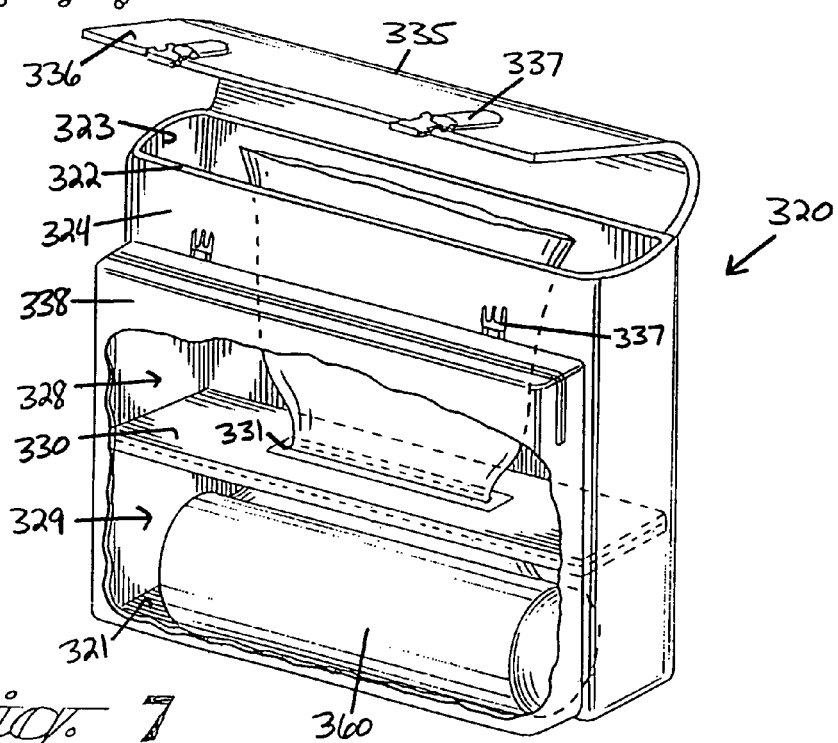
FIG. 7 is a fragmentary perspective view of the second alternative embodiment of the liner-dispensing trash receptacle system with parts removed to show a volume-dividing member, superior and inferior matter-receiving compartments, and a liner roll.

Trash-receiving container 320 preferably comprises a container bottom 321 as illustrated in FIGS. 6 and 7; a container rim 322 as illustrated in FIG. 7; an inner container surface 323 as illustrated in FIG. 7; a posterior outer container surface; an anterior outer container surface 234 as illustrated in FIGS. 6 and 7; a volume-dividing member 235 as illustrated in FIGS. 7, 8, 8(a), and 8(b); and divider attachment means. It is contemplated that the divider attachment means may either fixedly or removably attach volume-dividing member 325 to inner container surface 323. Should the manufacturer elect to removably attach volume-dividing member 325 to inner container surface 323, the divider attachment means may preferably be defined by hook and loop type fasteners such as VELCRO brand hook and loop fastening structure as generally illustrated in FIG. 8(b) at 326 or snaps 327 as generally illustrated in FIG. 8(a). Either hook or loop fastening structure or snap-receiving structures may thus be matably aligned at the inner container surface 323 for removably attaching volume-dividing member 325 to inner container surface 323 intermediate container rim 322 and container bottom 321. By thus removably attaching volume-dividing member 325 to inner container surface 323 intermediate container rim 322 and container bottom 321, a superior matter-receiving compartment 328 and an inferior matter-receiving compartment 329 are formed as generally referenced in FIG. 7.

It will be further seen that volume-dividing member 325 preferably comprises a superior divider surface 330 as illustrated in FIGS. 7 and 8; an inferior divider surface; and a matter-receiving aperture 331 as illustrated in FIGS. 7 and 8. Matter-receiving aperture 331 extends from superior divider surface 330 to the inferior divider surface and thus allows matter to be received in either superior matter-receiving compartment 328 or inferior matter-receiving compartment 329 from the adjacent matter-receiving compartment. For example, if the manufacturer elects to fixedly attach (for example, by stitching) volume-dividing member 325 to inner container surface 323, then matter-receiving aperture 331 must be sufficiently sized to accept an initial liner roll 360 (and replacement liner rolls 360) into inferior-matter receiving compartment 329 from superior matter-receiving compartment 328. It will thus be understood that matter-receiving aperture 331 serves as a conduit of sorts between adjacent matter-receiving compartments 328 and 329. Since matter-receiving aperture 331 serves as a conduit of sorts, it is further contemplated that matter-receiving aperture 331 may preferably further comprise aperture reinforcement structure as referenced at 332 in FIG. 8. It will thus be seen that aperture reinforcement structure 332 encircles matter-receiving aperture 331 for reinforcing matter-receiving aperture 331 and preferably comprises a resilient adaptable, pliant material such as nylon.

The vertical member attachment means or seat-engagement means are generally designed for juxtapositioning trash-receiving container 320 to a vertical member. More particularly, the vertical member attachment means or seat-engagement means are primarily designed for juxtapositioning trash-receiving container 320 adjacent a vehicular seat 312 as illustrated in FIG. 6. Vehicular seat 312 preferably comprises a substantially vertical, container-engaging surface 310 and superior located headrest 313. The seat-engagement means may preferably be defined by a strap assembly, the strap assembly comprising a strap 314 as illustrated in FIG. 6, and container-supporting means 315 as also generally illustrated in FIG. 6. Strap 314 preferably comprises first and second strap ends and a strap length intermediate the first and second strap ends. To engage trash-receiving container 320 with container-engaging surface 310, the strap length may be looped over the superior located member or headrest 313 substantially as illustrated in FIG. 6. Container-supporting means 315 thus attach the first and second strap ends to trash-receiving container. It will thus be understood that the seat-engagement means juxtaposition trash-receiving container 320 adjacent vehicular seat 312 for engagement with the substantially vertical, vehicular, container-engaging surface 310. Should the user wish to raise or lower trash-receiving container 320 adjacent container-engaging surface 310, it is further contemplated that the strap length may be adjustable so as to allow vertical positioning of trash-receiving container 320.

It should be noted that liner roll 360 is essentially identical to liner roll 160 save for a rod-receiving tunnel. It will be understood from an inspection of FIG. 7, that liner roll 360 does not rest upon a liner-retaining rod and thus has no effective use for a rod-receiving tunnel. However, liner roll 360 does comprise an axis of rotation extending through its longitudinal center. In this regard, liner roll 360 turns upon an axis of rotation extending through its longitudinal center when the user replaces the first trash-receiving liner with an intermediate trash-receiving liner substantially as earlier described. The outer surface of the intermediate trash-receiving liner frictionally engages inner container surface 323 at container bottom 321. The coefficient of friction is slight, however, as is the mass of liner roll 360, and thus any frictional forces present, for all intents and purposes, are typically negligible and thus may be ignored.

It is further contemplated that trash-receiving container 320 may further comprise a trash container lid 335 as illustrated in FIGS. 6 and 7. Trash container lid 335 is also preferably formed from an adaptable, pliant material (selectively padded), and comprises a posterior container attachment region and an anterior container closure region 336 as illustrated in FIGS. 6 and 7. The posterior container attachment region is preferably attached to the posterior outer container surface adjacent the container rim such that the roll beginning end 163 may be supported upon container rim 322. Anterior container closure region 336 is draped over anterior outer container surface 324 and thus encloses trash-receiving container 320 as generally illustrated in FIG. 6. Anterior container closure region 336 may further comprise lid-fastening means 337 as illustrated in FIGS. 6 and 7. The lid-fastening means are designed primarily for fastening anterior container closure region 336 to anterior outer container surface 324 as also generally illustrated in FIG. 6. The lid-fastening means may preferably be defined by comprising male and female fastening clasps as has been generally illustrated in the noted figures. Further, anterior outer container surface 324 may additionally comprise a matter-receiving pocket 338 as illustrated in FIGS. 6 and 7. Matter-receiving pocket 338 is also preferably formed from an adaptable, pliant material (selectively padded) and is intended to house accessories to trash-receiving container 320 such as a replacement liner roll 360, freely separated trash liners, sanitary wipes, or other materials or products as desired by the-user.

When the last trash-receiving liner becomes the first trash-receiving liner 161 and becomes full of trash or otherwise needs replacement as earlier described, the user must provide inferior matter-receiving compartment 329 with a replacement liner roll 360. When the last trash-receiving liner is utilized and installation of a replacement liner roll 360 is required, the user may remove volume-dividing member 325 from attachment to inner container surface 323 and place a replacement liner roll 360 into inferior matter-receiving compartment 329. Alternatively, the user may insert liner roll 360 through matter-receiving aperture 331 so as to place a replacement liner roll 360 into inferior matter-receiving compartment 329. In either case, roll beginning end 163 of first trash-receiving liner 161 is then inserted or fed through matter-receiving aperture 331, raised to an elevated position, and supported by container rim 322. It will thus be seen that each trash-receiving liner is fed or inserted through matter-receiving aperture 331 until the last trash-receiving liner becomes first trash receiving liner at which point the roll terminus end becomes seated atop superior divider surface 330.

Trash-receiving container 320, the vertical member attachment means or seat-engagement means, and liner roll 360 thus cooperatively form liner-dispensing trash receptacle system 300, which assembly is designed primarily for either removable or fixed attachment or engagement with vehicular container-engaging surface 310 substantially as described.

Alternative Embodiment No. 3

Figure 10:
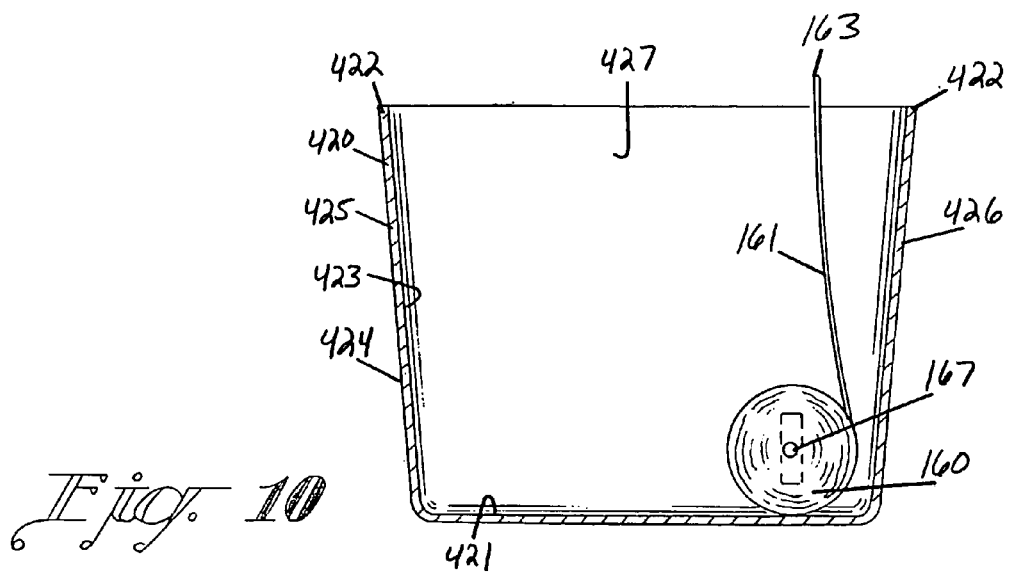
FIG. 10 is a cross sectional side view of a third embodiment of a liner-dispensing trash receptacle system depicting a first trash-receiving liner in an elevated position above a liner roll.
Figure 11:
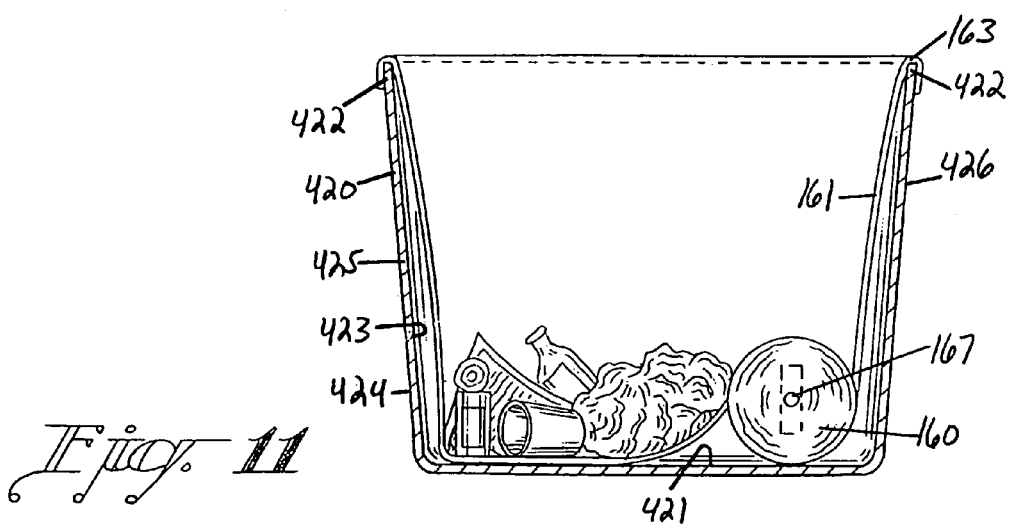
FIG. 11 is a cross sectional side view of the third embodiment of a liner-dispensing trash receptacle system as shown in FIG. 10 depicting the first trash-receiving liner supported by a container rim and having received trash.

A third alternative embodiment of the present invention generally concerns a liner-dispensing trash receptacle system for removable engagement with vehicular container-retaining means. More particularly, the third alternative embodiment of the present invention concerns a vehicular liner-dispensing trash receptacle system 400 for engagement with vehicular container-enclosing means as generally illustrated in FIGS. 10 and 11. The third alternative embodiment of the present invention thus also contemplates a combination motor vehicle and liner-dispensing trash receptacle system 400. The vehicular container-enclosing means is designed primarily for stowing liner-dispensing trash receptacle system 400 in a motor vehicle and may preferably be defined by an enclosable container-retaining assembly. The enclosable container-retaining assembly comprises a container housing and a movable container-retaining cart 470 as generally illustrated in FIGS. 13 and 14.

Figure 13:
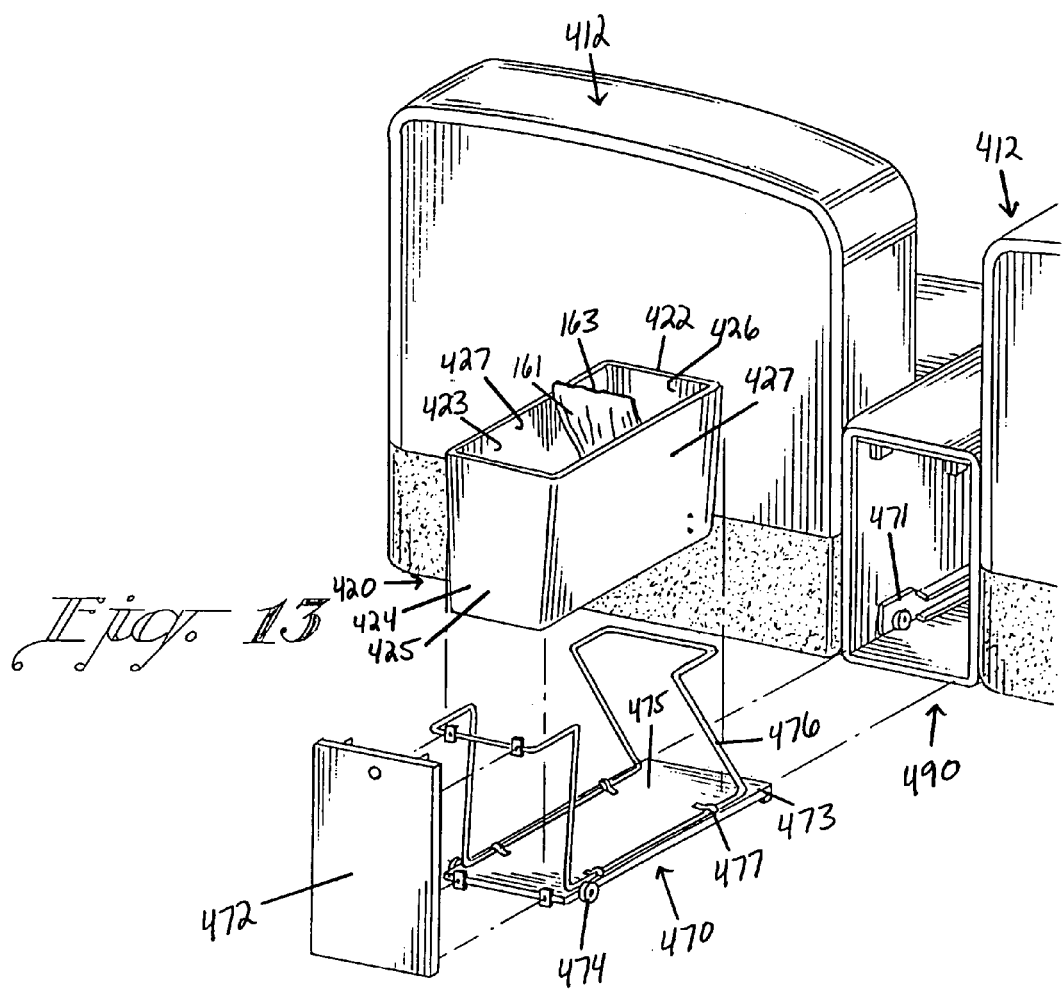
FIG. 13 is an exploded perspective view of a third embodiment of the liner-dispensing trash receptacle system and seat-based vehicular container-enclosing means.
Figure 14:
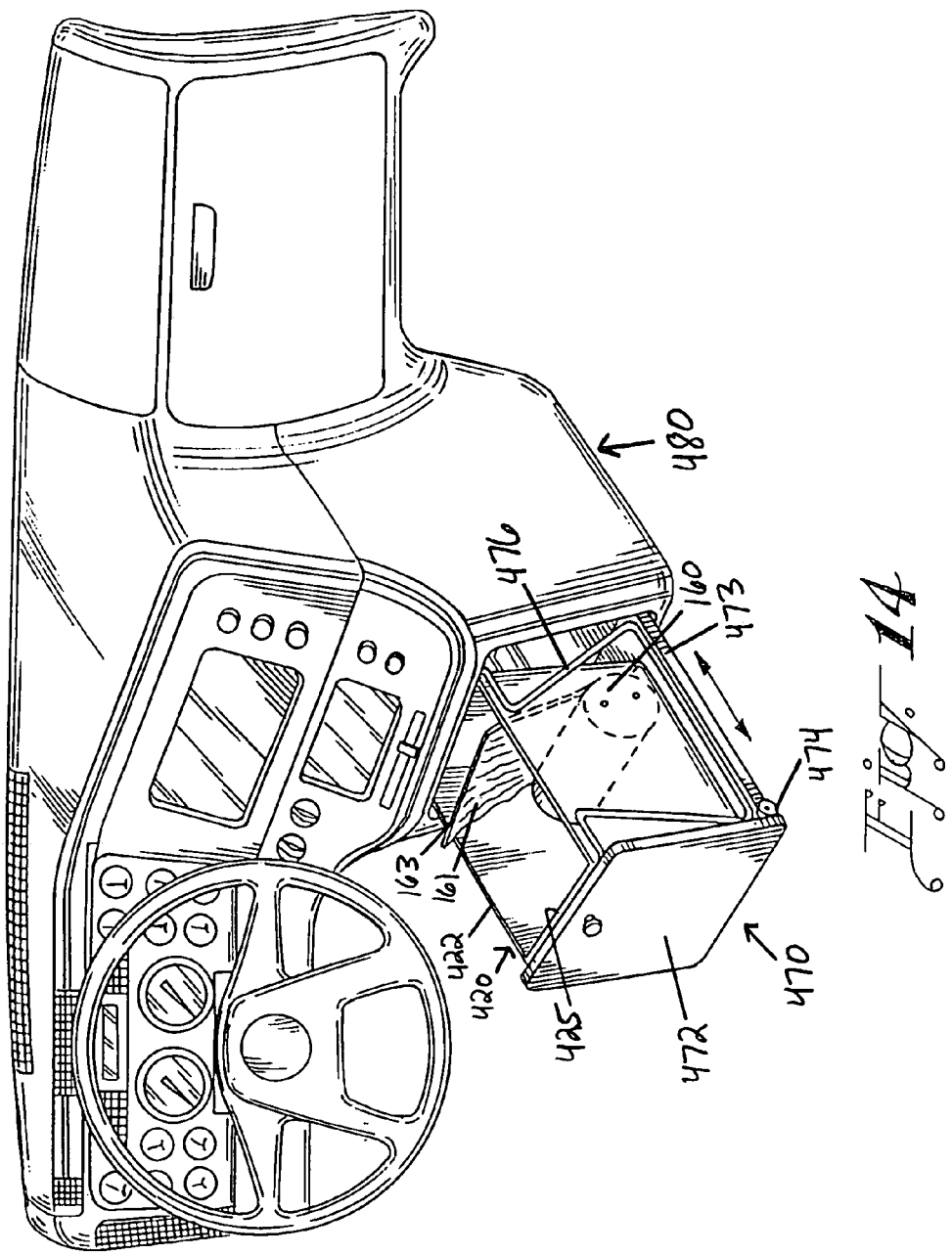
FIG. 14 is a perspective view of a third embodiment of the liner-dispensing trash receptacle system and dashboard-based vehicular container-enclosing means.

The container housing essentially comprises a select vehicular compartment, the select vehicular compartment being selected from the group consisting of a vehicular dashboard console 480 as illustrated in FIG. 14; a vehicular seat-based console 490 as illustrated in FIG. 13; and a vehicular stowage compartment (not illustrated). It will be understood that vehicular dashboard console 480 is generally located inferior to a vehicular windshield or alternatively forwardly adjacent the driver seat as generally depicted in FIG. 14. It will be further understood that vehicular seat-based console 490 is generally located intermediate laterally opposed vehicular seats 412 as generally depicted in FIG. 13. The vehicular stowage compartment, while not illustrated, is generally located in an inner vehicle peripheral wall such as vehicular walls inferior to passenger windows and the like. It will be seen in any event, however, that the container housing or select vehicular compartment preferably comprises a cart track 471 as illustrated in FIG. 13, and a movable door 472 as illustrated in FIGS. 6, 13 and 14. Movable container-retaining cart 470 essentially comprises track-engaging means and container-retaining structure.

The track-engaging means may preferably be defined by a container-supporting platform 473 as illustrated in FIGS. 13 and 14, and roller means for movement as generally referenced at 474 in FIGS. 13 and 14. It will be understood that container-supporting platform 473 essentially comprises a superior platform surface 475 as illustrated in FIG. 13 and an inferior platform surface. The roller means for movement are preferably fixedly attached to the inferior platform surface and the container-retaining structure is preferably fixedly attached to superior platform surface 475. Cart track 471 rollably receives the roller means for movement as generally depicted in FIG. 13.

The container-retaining structure is preferably defined by a retention frame 476 as illustrated in FIGS. 13 and 14. Retention frame 476 is preferably formed from or constructed from a rigidly adaptable material having high memory such as metal and preferably comprises at least one anterior upright member, at least one posterior upright member, and platform-engaging means. The anterior upright member removably engages anterior container wall 425 and first and second container side walls 427. The posterior upright member removably engages posterior container wall 426 and first and second container side walls, 427. The platform-engaging means fixedly attach retention frame 476 to superior platform surface 475 as generally depicted in FIG. 13 where the platform-engaging means are referenced at 477.

The container-retaining structure or retention frame 476 is thus preferably fixedly mounted to the track-engaging means and is sized and shaped to removably engage the exterior matter-engaging volume of outer container surface 424. In operation, the container-retaining structure preferably removably engages trash-receiving container 420 such that trash-receiving container 420 may be removed from the container-retaining structure at the election of the user for cleaning or other maintenance.

The container housing or select vehicular compartment is sized and shaped to house container-retaining cart 470 and liner-dispensing trash receptacle system 400. It follows that container-retaining cart 470 and liner-dispensing trash receptacle system 400 may be housed in the select vehicular compartment. Movable door 472 thus serves to enclose container-retaining cart 470 and liner-dispensing trash receptacle system 400 within the container housing thus effectively stowing the liner-dispensing trash receptacle system 400. It should be noted that the anterior upright member may preferably further comprise door attachment means whereby the door attachment means either fixedly or removably attach movable door 472 to container-retaining cart 470 as is generally depicted in FIGS. 13 and 14.

Figure 12:
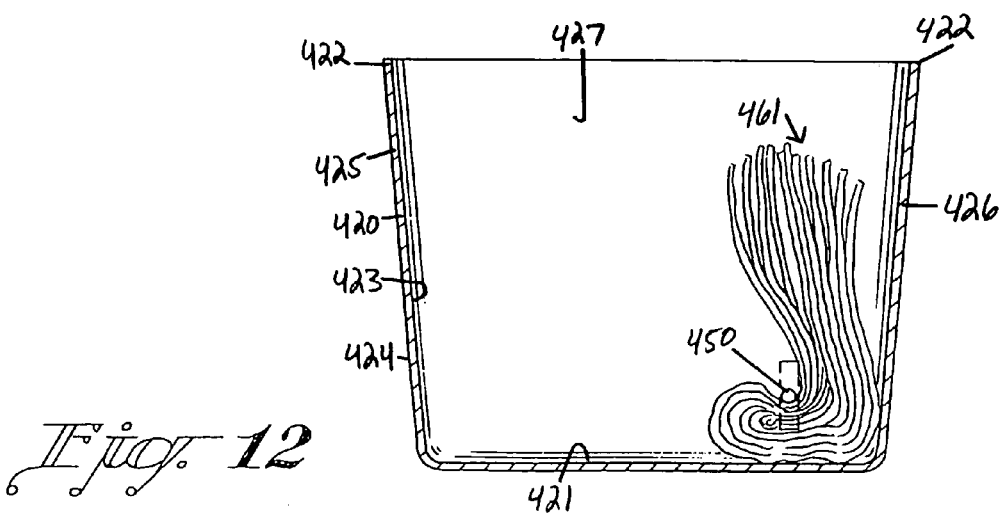
FIG. 12 is a cross sectional side view of a third embodiment of a liner-dispensing trash receptacle system depicting a plurality of freely separated trash-receiving liners wedged intermediate the liner-retaining rod and a select container wall.

Liner-dispensing trash receptacle system 400 preferably comprises a trash-receiving container 420 as illustrated in FIGS. 10–14; a liner-dispensing assembly 430 as illustrated in FIG. 9; and liner roll 160. Trash container 420 is preferably formed or constructed from a semi-rigid material such as durable plastic and comprises a container bottom 421 as illustrated in FIGS. 9–12; a container rim 422 as illustrated in FIGS. 10–14; an inner container surface 423 as illustrated in FIGS. 9–13; an outer container surface 424 as illustrated in FIGS. 10–13; an anterior container wall 425 as illustrated in FIGS. 10–13, a posterior container wall 426 as illustrated in FIGS. 10–13; and laterally opposed first and second container side walls 427 as illustrated in FIGS. 10, 12, and 13. As will be seen from an inspection FIGS. 10–13, inner container surface 423 defines a superior matter-receiving volume and outer container surface 424 defines an exterior matter-engaging volume. In other words, the matter-engaging volume is the outer volume of trash-receiving container 420, which outer volume is cooperatively associated with certain vehicle structure, namely, the vehicular container-enclosing means. The exterior matter-engaging volume is designed primarily for removable engagement with the vehicular container-enclosing means, which as earlier noted is designed for stowing liner-dispensing trash receptacle system 400.

Liner-dispensing assembly 430 generally comprises laterally spaced rod-retaining means and a liner-retaining rod. More particularly, liner-dispensing assembly 430 preferably comprises first and second laterally spaced rod-retaining members, first and second anchor structures 440, and a liner-retaining rod 450. Generally, the rod-retaining means comprise rod-receiving pivot means, rod-retaining removable attachment means, and container-fastening means. More particularly, the first rod-retaining member preferably comprises rod-receiving pivot means and the second rod-retaining member preferably comprises rod-receiving removable attachment means. The first and second rod-retaining members each further preferably comprise anchor-engaging means. The first and second anchor structures 440 each preferably comprise container-fastening means for fastening the first and second anchor structures 440 to inner container surface 423 of the first and second container side walls 427 adjacent container bottom 421 and a select container wall, the select container wall being selected from the group consisting of anterior container wall 425 and posterior container wall 426.

Liner-retaining rod 450 essentially comprises a first rod end 451 and a second rod end 452 as illustrated in FIG. 9. As will be seen from an inspection of FIG. 9, first rod end 451 is pivotally connected to rod-receiving pivot means and second rod end 452 is designed for removable attachment to rod-receiving removable attachment means. The rod-receiving pivot means may preferably be defined by a U-shaped member 431 as illustrated in FIG. 9. U-shaped member 431 essentially comprises first and second first anchor attachment ends and a rod-engaging length intermediate the first and second first anchor attachment ends. The first and second first anchor attachment ends are fixedly mounted to the first anchor 440. The rod-receiving removable attachment means may preferably be defined by a hook member 436 as illustrated in FIG. 9. Hook member 436 essentially comprises a second anchor attachment end and a rod-engaging hook end. The second anchor attachment end is fixedly mounted to the second anchor 440.

It will be noted that the anchor-engaging means are essentially defined by the first and second first anchor attachment ends and the second anchor attachment end. First rod end 451 essentially comprises a first loop structure, the first loop structure being pivotally mounted to the rod-engaging length of U-shaped member 431. Second rod end 452 essentially comprises a second loop structure, the second loop structure being removably engaged with rod-engaging hook end of hook member 436. It will thus be understood that liner-retaining rod 450 is pivotal about an axis extending through the rod-engaging length of U-shaped member 431 when second rod end 452 is removed from the rod-engaging hook end of hook member 436.

It is further contemplated that liner-retaining rod 450 may further comprise a male rod portion 453 and a female rod portion 454 as further illustrated in FIG. 9. Male rod portion 453 essentially comprises a first male rod end and a second male rod end. The first male rod end essentially comprises a compression coil 455 and is telescopically received in female rod portion 454 as illustrated in FIG. 9. Compression coil 455 thus engages male rod portion 453 and female rod portion 454 for spring biasing male rod portion. It will be noted that second male rod end 453 coincides with the second rod end 452.

It should be further noted that liner-retaining rod 450 is preferably spatially located a select distance from the select container wall (either anterior container wall 425 or posterior container wall 426) and container bottom 421. The select distance should be sufficient to enable a user to snugly wedge a plurality of freely separated or free liners 461 between liner-retaining rod 450 and the select container wall and container bottom 421 as generally illustrated or depicted in FIG. 12.

As earlier noted, liner-dispensing trash receptacle system 400 preferably comprises, in part, liner roll 160. Accordingly, when the last trash-receiving liner becomes the first trash-receiving liner 161 and becomes full of trash or otherwise needs replacement as earlier described, the user must provide liner-dispensing assembly 430 with a replacement liner roll 160. When the last trash-receiving liner is utilized and installation of a replacement liner roll 160 is required, the user may remove the second loop structure from the hook end of hook member 436 and pivot liner-retaining rod 450 about the axis extending through the rod-engaging length of U-shaped member 431. By pivoting about the axis extending through the rod-engaging length of U-shaped member 431, second rod end 452 thus becomes free for receiving a replacement liner roll 160. In this last regard, second rod end 452 is inserted into a replacement rod-receiving tunnel 168 as earlier described and liner-retaining rod 450 is return rotated or pivoted about the axis extending through the rod-engaging length of U-shaped member 431 such that rod-receiving tunnel 168 is returned to a substantially horizontal position and the hook end of hook member 436 again removably accepts the second loop structure of second rod end 452.

Trash-receiving container 420, liner-dispensing assembly 430, and liner roll 160 thus cooperatively form liner-dispensing trash receptacle system 400, which assembly is designed primarily for engagement with vehicular container-enclosing means substantially as described.

It will thus be seen that the present invention further provides a low cost, liner-dispensing trash receptacle system for use in combination with a motor vehicle. It will be further seen that the present invention more particularly provides a liner-dispensing trash receptacle system for engagement with a vehicular container-engaging or container-enclosing surface. In this last regard, the present invention contemplates a motor vehicle comprising at the very least a container-engaging surface, at least one vehicular seat, and a select vehicular compartment selected from the group consisting of a vehicular dashboard console, a vehicular seat-based console, and a vehicular stowage compartment generally located at the inner periphery of a vehicle.

Further, it will be sent that the present invention provides a liner-dispensing trash receptacle system comprising a trash-receiving container, a liner-dispensing assembly, and a liner roll. The trash-receiving container essentially comprises a container bottom, a container rim, an inner container surface, and an outer container surface. The inner container surface essentially defines a superior matter-receiving volume and the outer container surface is cooperatively associated with a container-engaging surface.

The liner-dispensing assembly comprises first and second laterally spaced rod-retaining members, first and second anchor structures, and a liner-retaining rod. In the most preferred embodiment, it will be seen that the liner-retaining rod is preferably L-shaped. The first and second rod-retaining members each comprise a superior rod-receiving end and an inferior anchor-engaging end. The superior rod-receiving ends each comprise rod-receiving means. The inferior anchor-engaging ends are each pivotally connected to the first and second anchor structures. The first and second anchor structures each comprise container-fastening means, the container-fastening means anchoring the first and second anchor structures to the inner container surface. The liner-retaining rod comprises first and second rod ends, the first and second rod ends being selectively received by the rod-receiving means. It is contemplated that the container-fastening means for anchoring the first and second anchor structures to the inner container surface may preferably be defined by a select fastening structure, the select fastening structure being selected from the group consisting of a nut and bolt fastening assembly, a hook and loop fastening assembly, and a suction cup fastening assembly.

The liner roll essentially comprises a continuously-furled liner length having a plurality of perforated zones intermediate each successively queued trash-receiving liner and a rod-receiving center. The rod-receiving center receives the liner-retaining rod and the container rim supports a roll beginning end of the first trash-receiving liner. The liner-retaining rod is spatially located in the trash-receiving container so as to allow the liner roll to turn upon the liner-retaining rod about an axis extending through the rod-receiving center. The trash-receiving container, the liner-dispensing assembly and the liner roll thus form a liner-dispensing trash receptacle system for cooperative association with the container-engaging surface.

While the above descriptions contain much specificity, this specificity should not be construed as limitations on the scope of the invention, but rather as an exemplification of the invention. For example, as has been described above, second rod-receiving member 135 need not comprise a pin-engaging slot 139 at the respective inferior anchor-engaging end 137. Rather, the inferior anchor-engaging end of second rod-receiving member 135 may simply comprise a pin-engaging aperture for receiving the laterally-extending pivot pin 143 cooperatively associated with second rod-retaining member 135. It will thus be understood that the user may then slide first rod-retaining member 131 laterally toward inner container surface 123 such that the laterally-extending pivot pin 143 cooperatively associated with first rod-retaining member 131 becomes located at the medial slot end of the respective pin-engaging slot 139 thus effectively removing first rod end 151 from removable insertion in horizontally-aligned rod-receiving aperture 133 and allowing second rod-retaining member to rotate or pivot about the laterally-extending pivot pin 143 cooperatively associated with second rod-retaining member 135.

Accordingly, although the invention has been described by reference to a preferred embodiment and several described alternative embodiments, it is not intended that the novel assembly be limited thereby, but that modifications thereof are intended to be included as falling within the broad scope and spirit of the foregoing disclosure, the following claims and the appended drawings.

I claim:

1. A liner-dispensing trash receptacle system for engagement with a vehicular container-engaging surface, the liner-dispensing trash receptacle system comprising:

a trash-receiving container, the trash-receiving container being formed from a semi-rigid material, the trash-receiving container comprising a container bottom, a container rim, an inner container surface, and an outer container surface, the inner container surface defining a superior matter-receiving volume, the outer container surface defining an inferior matter-receiving volume at the container bottom, the inferior matter-receiving volume for engagement with a vehicular container-engaging surface;

a liner-dispensing assembly, the liner-dispensing assembly comprising first and second laterally spaced rod-retaining members, first and second anchor structures, and an L-shaped liner-retaining rod, the first rod-retaining member comprising a first superior rod-receiving end, the second rod-retaining member comprising a second superior rod-receiving end, the first and second rod-retaining members each comprising an inferior anchor-engaging end, the first superior rod-receiving end comprising a horizontally-aligned rod-receiving aperture, the second superior rod-receiving end comprising a vertically-aligned rod-receiving aperture, the inferior anchor-engaging ends each comprising a pin-engaging slot, each pin-engaging slot having a medial slot end and a lateral slot end, the first and second anchor structures each comprising a vertical pin-retaining structure and a horizontal container-engaging structure, the vertical pin-retaining structures each comprising a laterally-extending pivot pin, the horizontal container-engaging structures each comprising container-fastening means for anchoring the first and second anchor structures to the inner container surface at the container bottom, the L-shaped liner-retaining rod comprising a linear first rod end and an angled second rod end, the second rod end being fixedly received in the vertically-aligned rod-receiving aperture, the first rod end for removable insertion into the horizontally-aligned rod-receiving aperture; and a liner roll, the liner roll comprising a first trash-receiving liner, a plurality of intermediate trash-receiving liners; and a last trash-receiving liner, the first trash-receiving liner comprising a roll beginning end and a first liner-engaging end, each intermediate trash-receiving liner comprising an intermediate trash-receiving end and an intermediate liner-engaging end, the last trash-receiving liner comprising a last trash-receiving end and a roll terminus end, each intermediate trash-receiving end removably connected to a liner-engaging end, each intermediate liner-engaging end removably connected to a trash-receiving end, the first trash-receiving liner, the intermediate trash-receiving liners, and the last trash-receiving liner thus forming a continuously-furled liner length, the liner length comprising a plurality of perforated zones and a rod-receiving center, the last trash-receiving liner forming a rod-receiving tunnel at the rod-receiving center, the rod-receiving tunnel receiving the first rod end, the rod-receiving tunnel having a tunnel axis, the first rod end being removably inserted into the horizontally-aligned rod-receiving aperture, the laterally-extending pivot pins being located at the lateral slot ends, the container rim for supporting the roll beginning end, the liner-retaining rod being spatially located to allow the liner roll to turn upon the liner-retaining rod about the tunnel axis, the trash-receiving container, the liner-dispensing assembly, and the liner roll thus forming a liner-dispensing trash receptacle system for engagement with a vehicular container-engaging surface.

2. The liner-dispensing trash receptacle system of claim 1 wherein the container-fastening means for anchoring the first and second anchor structures to the inner container surface at the container bottom is defined by select fastening structure, the select fastening structure being selected from the group consisting of a nut and bolt fastening assembly, a hook and loop fastening assembly, and a suction cup fastening assembly.

3. The liner-dispensing trash receptacle system of claim 2 wherein the nut and bolt fastening assembly is defined by anchoring-engaging superior structure and container-engaging inferior structure, the inferior matter-receiving volume being defined by an assembly-receiving cavity at the container bottom, the assembly-receiving cavity for receiving the container-engaging inferior structure.

4. The liner-dispensing trash receptacle system of claim 2 wherein the hook and loop fastening assembly is defined by superior hook structure and inferior loop structure, the superior hook structure being adhesively attached to the horizontal container-engaging structures and the inferior loop structure being adhesively attached to the inner container surface at the container bottom.

5. The liner-dispensing trash receptacle system of claim 2 wherein the inner container surface at the container bottom is smooth, the suction cup assembly comprising first and second suction cups, each suction cup comprising an inferior vacuum surface and superior structure attachment means, the superior structure attachment means being fixedly attached to the horizontal container-engaging structures, the vacuum surfaces for removably attaching the first and second anchor structures to the smooth inner container surface at the container bottom.

6. The liner-dispensing trash receptacle system of claim 2 wherein each laterally-extending pivot pin comprises a pin cap, the pin caps for retaining the rod-retaining members in adjacency to the vertical pin-retaining structures.

7. The liner-dispensing trash receptacle system of claim 3 wherein the nut and bolt assembly fixedly anchors the liner-dispensing trash receptacle system to the vehicular container-engaging surface.

8. A liner-dispensing trash receptacle system for engagement with a vehicular container-engaging surface, the liner-dispensing trash receptacle system comprising:
 a trash-receiving container, the trash-receiving container being formed from a semi-rigid material, the trash-receiving container comprising a container bottom, a container rim, an inner container surface, and an outer container surface, the inner container surface defining a superior matter-receiving volume, the outer container surface for engagement with a vehicular container-engaging surface;
 a liner-dispensing assembly, the liner-dispensing assembly comprising first and second laterally spaced rod-retaining members, assembly anchoring means, and an L-shaped liner-retaining rod, the first rod-retaining member comprising a first superior rod-receiving end, the second rod-retaining member comprising a second superior rod-receiving end, the first and second rod-retaining members each comprising an inferior anchor-engaging end, the first superior rod-receiving end comprising a rod-receiving hook, the second superior rod-receiving end comprising a vertically-aligned rod-receiving aperture, the inferior anchor-engaging ends each comprising pivot attachment means, the pivot attachment means for enabling the first rod-retaining member to pivot about a latitudinally-aligned axis and the second rod-retaining member to pivot about a longitudinally-aligned axis, the assembly anchoring means for anchoring the first and second rod-retaining members to the inner container surface at the container bottom, the L-shaped liner-retaining rod comprising a linear first rod end and an angled second rod end, the second rod end being fixedly received in the vertically-aligned rod-receiving aperture, the first rod end for removable receipt by the rod-receiving hook; and
 a liner roll, the liner roll comprising a first trash-receiving liner, a plurality of intermediate trash-receiving liners, and a last trash-receiving liner, the first trash-receiving liner comprising a roll beginning end and a first liner-engaging end, each intermediate trash receiving liner comprising an intermediate trash-receiving end and an intermediate liner-engaging end, the last trash-receiving liner comprising a last trash-receiving end and a roll terminus end, each intermediate trash-receiving end removably connected to a liner-engaging end, each intermediate liner-engaging end removably connected to a trash-receiving end, the first trash-receiving liner, the intermediate trash-receiving liners, and the last trash-receiving liner thus forming a continuously-furled liner length, the liner length comprising a plurality of perforated zones and a rod-receiving center, the last trash-receiving liner forming a rod-receiving tunnel at the rod-receiving center, the rod-receiving tunnel receiving the first rod end, the rod-receiving tunnel having a tunnel axis, the first rod end being removably received by the rod-receiving hook, the container rim for supporting the roll beginning end, the liner-retaining rod being spatially located to allow the liner roll to turn upon the liner-retaining rod about the tunnel axis, the trash-receiving container, the liner-dispensing assembly, and the liner roll thus forming a liner-dispensing trash receptacle system for engagement with a vehicular container-engaging surface.

9. The liner-dispensing trash receptacle system of claim 8 wherein the pivot attachment means are defined by first and second pivot pin assemblies, the first pivot pin assembly comprising vertical, longitudinally-aligned pivot pin-retaining structure and horizontally-aligned first anchor attachment structure, the vertical, longitudinally-aligned pivot pin-retaining structure comprising at least one first pivot pin, the second pivot pin assembly comprising vertical, latitudinally-aligned pivot pin-retaining structure and horizontally-aligned second anchor attachment structure, the vertical, latitudinally-aligned pivot pin-retaining structure comprising at least one second pivot pin, the pivot attachment means thus enabling the first rod-retaining member to pivot about a latitudinally-aligned axis extending through the first pivot pin and the second rod-retaining member to pivot about a longitudinally-aligned axis extending through the second pivot pin.

10. The liner-dispensing trash receptacle system of claim 8 wherein the assembly anchoring means is defined by select fastening structure, the select fastening structure being selected from the group consisting of a nut and bolt fastening assembly, a hook and loop fastening assembly, and a suction cup fastening assembly.

11. The liner-dispensing trash receptacle system of claim 8 wherein the outer container surface defines an inferior matter-receiving volume at the container bottom, the inferior matter-receiving volume for engagement with a vehicular container-engaging surface.

12. The liner-dispensing trash receptacle system of claim 10 wherein the nut and bolt fastening assembly is defined by anchoring-engaging superior structure and container-engaging inferior structure, the inferior matter-receiving volume being defined by an assembly-receiving cavity at the container bottom, the assembly-receiving cavity for receiving the container-engaging inferior structure.

13. The liner-dispensing trash receptacle system of claim 10 wherein the hook and loop fastening assembly is defined by superior hook structure and inferior loop structure, the superior hook structure being adhesively attached to the horizontally-aligned first and second anchor attachment structures, and the inferior loop structure being adhesively attached to the inner container surface at the container bottom.

14. The liner-dispensing trash receptacle system of claim 10 wherein the inner container surface at the container bottom is smooth, the suction cup assembly comprising first and second suction cups, each suction cup comprising an inferior vacuum surface and superior structure attachment means, the superior structure attachment means being fixedly attached to the horizontal container-engaging structures, the vacuum surfaces for removably attaching the first and second anchor structures to the smooth inner container surface at the container bottom.

15. The liner-dispensing trash receptacle system of claim 12 wherein the nut and bolt assembly fixedly anchors the liner-dispensing trash receptacle system to the vehicular container-engaging surface.

16. A liner-dispensing trash receptacle system for engagement with a substantially vertical, vehicular, container-engaging surface, the liner-dispensing trash receptacle system comprising:
   a trash-receiving container, the trash-receiving container being formed from an adaptable, pliant material, the trash-receiving container comprising a container bottom, a container rim, an inner container surface, a posterior outer container surface, an anterior outer container surface, a volume-dividing member, and divider attachment means, the divider attachment means for attaching the volume-dividing member to the inner container surface intermediate the container rim and the container bottom thus forming a superior matter-receiving compartment and an inferior matter-receiving compartment, the volume-dividing member comprising a superior divider surface, an inferior divider surface, and a matter-receiving aperture, the matter-receiving aperture extending from the superior divider surface to the inferior divider surface;
   seat-engagement means, the seat-engagement means for juxtapositioning the trash-receiving container adjacent a vehicular seat, the vehicular seat comprising a substantially vertical, container-engaging surface and a superior located headrest; and
   a liner roll, the liner roll being placed in the inferior matter-receiving compartment, the liner roll comprising a first trash-receiving liner, a plurality of intermediate trash-receiving liners, and a last trash-receiving liner, the first trash-receiving liner comprising a roll beginning end and a first liner-engaging end, each intermediate trash receiving liner comprising an intermediate trash-receiving end and an intermediate liner-engaging end, the last trash-receiving liner comprising a last trash-receiving end and a roll terminus end, each intermediate trash-receiving end removably connected to a liner-engaging end, each intermediate liner-engaging end removably connected to a trash-receiving end, the first trash-receiving liner, the intermediate trash-receiving liners, and the last trash-receiving liner thus forming a continuously-furled liner length, the liner length comprising a plurality of perforated zones, the roll beginning end being inserted through the matter-receiving aperture, the container rim for supporting the roll beginning end, the trash-receiving container, the seat-engagement means, and the liner roll thus forming a liner-dispensing trash receptacle system for engagement with a substantially vertical, vehicular, container-engaging surface.

17. The liner-dispensing trash receptacle system of claim 16 wherein the trash-receiving container is constructed from padded adaptable, pliant material.

18. The liner-dispensing trash receptacle system of claim 16 wherein the seat-engagement means is defined by a strap assembly, the strap assembly comprising a strap and container-supporting means, the strap comprising first and second strap ends and a strap length, the strap length being looped over the headrest, the container-supporting means attaching the first and second strap ends to the trash-receiving container, the seat-engagement means thus juxtapositioning the trash-receiving container adjacent the vehicular seat for engagement with the substantially vertical, vehicular, container-engaging surface.

19. The liner-dispensing trash receptacle system of claim 18 wherein the strap length is adjustable.

20. The liner-dispensing trash receptacle system of claim 16 wherein the trash-receiving container comprises a trash container lid, the trash container lid being formed from an adaptable, pliant material, the trash container lid having a posterior container attachment region and an anterior container closure region, the container attachment region being attached to the posterior outer container surface adjacent the container rim, the anterior container closure region being draped over the anterior outer container surface thus enclosing the trash-receiving container.

21. The liner-dispensing trash receptacle system of claim 20 wherein the anterior container closure region comprises lid fastening means, the lid fastening means for fastening the anterior container closure region to the anterior outer container surface.

22. The liner-dispensing trash receptacle system of claim 16 wherein the anterior outer container surface further comprises a matter-receiving pocket, the matter receiving pocket being formed from an adaptable, pliant material.

23. The liner-dispensing trash receptacle system of claim 16 wherein the volume-dividing member comprises aperture reinforcement structure, the aperture reinforcement structure encircling the matter-receiving aperture for reinforcing the matter-receiving aperture.

24. A liner-dispensing trash receptacle system for engagement with vehicular container-retaining means, the vehicular container-enclosing means for stowing the liner-dispensing trash receptacle system, the liner-dispensing trash receptacle system comprising:
   a trash-receiving container, the trash-receiving container comprising a container bottom, a container rim, an inner container surface, an outer container surface, an anterior container wall, a posterior container wall, and laterally opposed first and second container side walls, the inner container surface defining a superior matter-receiving volume, the outer container surface defining an exterior matter-engaging volume, the exterior matter-engaging volume for removable engagement with vehicular container-enclosing means, the vehicular container-enclosing means for stowing the liner-dispensing trash receptacle system;
   a liner-dispensing assembly, the liner-dispensing assembly comprising first and second laterally spaced rod-retaining members, first and second anchor structures, and a liner-retaining rod, the first rod-retaining member comprising rod-receiving pivot means, the second rod-retaining member comprising rod-receiving removable attachment means, the first and second rod-retaining members each comprising anchor-engaging means, the first and second anchor structures each comprising container-fastening means for fastening the first and second anchor structures to the inner container surface of the first and second container side walls adjacent the container bottom and a select container wall, the select container wall being selected from the group consisting of the anterior container wall and the posterior container wall, the liner-retaining rod comprising a first rod end and a second rod end, the first rod end being pivotally connected to the rod-receiving pivot means, the second rod end for removable attachment to the rod-receiving removable attachment means; and a liner roll, the liner roll comprising a first trash-receiving liner, a plurality of intermediate trash-receiving liners, and a last trash-receiving liner, the first trash-receiving liner comprising a roll beginning end and a first liner-engaging end, each intermediate trash receiving liner comprising an intermediate trash-receiving end and an intermediate liner-engaging end, the last trash-receiving liner comprising a last trash-receiving end and a roll terminus end, each intermediate trash-receiving end removably connected to a liner-engaging end, each intermediate liner-engaging end removably connected to a trash-receiving end, the first trash-receiving liner, the intermediate trash-receiving liners, and the last trash-receiving liner thus forming a continuously-furled liner length, the liner length comprising a plurality of perforated zones and a rod-receiving center, the last trash-receiving liner forming a rod-receiving tunnel at the rod-receiving center, the rod-receiving tunnel having a tunnel axis, the rod-receiving tunnel receiving the liner-retaining rod, the second rod end being removably attached to the rod-receiving removable attachment means, the container rim for supporting the roll beginning end, the liner-retaining rod being spatially located to allow the liner roll to turn upon the liner-retaining rod about the tunnel axis, the trash-receiving container, the liner-dispensing assembly, and the liner roll thus forming a liner-dispensing trash receptacle system for engagement with the vehicular container-enclosing means, the vehicular container-enclosing means for stowing the liner-dispensing trash receptacle system.

25. The liner-dispensing trash receptacle system of claim 24 wherein the vehicular container-enclosing means is defined by an enclosable container-retaining assembly, the enclosable container-retaining assembly comprising a container housing and a movable container-retaining cart, the container housing comprising a select vehicular compartment, the select vehicular compartment being selected from the group consisting of a vehicular dashboard console, a vehicular seat-based console, and a vehicular stowage compartment, the vehicular dashboard console being located forwardly adjacent a driver seat, the vehicular seat-based console being located intermediate laterally opposed vehicular seats, the vehicular stowage compartment being located in an inner vehicle peripheral wall, the container housing comprising a cart track and a movable door, the movable container-retaining cart comprising track-engaging means and container-retaining structure, the container-retaining structure being fixedly mounted to the track-engaging means, the container-retaining structure being sized and shaped to removably engage the exterior matter-engaging volume, the container-retaining structure removably engaging the trash container, the track-engaging means engaging the cart track, the container housing being sized and shaped to house the container-retaining cart and the liner-dispensing trash receptacle system, the container-retaining cart and liner-dispensing trash receptacle system being housed in the select vehicular compartment, the movable door enclosing the container-retaining cart and liner-dispensing trash receptacle system within the container housing thus stowing the liner-dispensing trash receptacle system.

26. The liner-dispensing trash receptacle system of claim 25 wherein the track-engaging means is defined by a container-supporting platform and roller means for movement, the container-supporting platform comprising a superior platform surface and an inferior platform surface, the roller means for movement fixedly attached to the inferior platform surface, the container-retaining structure being fixedly attached to the superior platform surface, the cart track rollably receiving the roller means for movement.

27. The liner-dispensing trash receptacle system of claim 26 wherein the container-retaining structure is defined by a retention frame, the retention frame comprising at least one anterior upright member, at least one posterior upright member, and platform-engaging means, the anterior upright member removably engaging the anterior container wall and the first and second container side walls, the posterior upright member removably engaging the posterior container wall and the first and second container side walls, the platform-engaging means fixedly attached to the superior platform surface.

28. The liner-dispensing trash receptacle system of claim 27 wherein the anterior upright member comprises door attachment means, the door attachment means fixedly attaching to the movable door to the container-retaining cart.

29. The liner-dispensing trash receptacle system of claim 24 wherein the rod-receiving pivot means are defined by a U-shaped member, the U-shaped member comprising first and second first anchor attachment ends and a rod-engaging length, the rod-engaging length being intermediate the first and second first anchor attachment ends, the first and second anchor attachment ends being fixedly mounted to the first anchor structure, the rod-receiving removable attachment means being defined by a hook member, the hook member comprising a second anchor attachment end and a rod-engaging hook end, the second anchor attachment end being fixedly mounted to the second anchor structure, the anchor-engaging means being defined by the anchor attachment ends, the first rod end comprising a first loop structure, the first loop structure being pivotally mounted to the rod-engaging length, the second rod end comprising a second loop structure, the second loop structure being removably engaged with the rod-engaging hook end, the liner-retaining rod being pivotal about an axis extending through the rod-engaging length.

30. The liner-dispensing trash receptacle system-of claim 24 wherein the liner-retaining rod comprises a male rod portion and a female rod portion, the male rod portion comprising a first male rod end and a second male rod end, the first male rod end comprising a compression coil, the first male rod end telescopically received in the female rod portion, the compression coil engaging the male rod portion and the female rod portion, the second male rod end coinciding with the second rod end.

31. The liner-dispensing trash receptacle system of claim 24 wherein the liner-retaining rod is spatially located a select distance from the select container wall and the container bottom, the select distance being sufficient to enable a user to snugly wedge a plurality of free liners between the liner-retaining rod and the select container wall and container bottom.

32. In combination, a liner-dispensing trash receptacle system and a motor vehicle, the combination comprising:
 a motor vehicle, the motor vehicle comprising a vehicular container-engaging surface, the vehicular container-engaging surface for receiving and stowing a liner-dispensing trash receptacle system, the liner-dispensing trash receptacle system comprising:
  a trash container, the trash container comprising a container bottom, a container rim, an inner container surface, and an outer container surface, the inner container surface defining a superior matter-receiving volume, the outer container surface defining an inferior matter-receiving volume at the container bottom, the inferior matter-receiving volume for engagement with the vehicular container-engaging surface;

a liner-dispensing assembly, the liner-dispensing assembly comprising first and second laterally spaced rod-retaining members, first and second anchor structures, and an L-shaped liner-retaining rod, the first rod-retaining member comprising a first superior rod-receiving end, the second rod-retaining member comprising a second superior rod-receiving end, the first and second rod-retaining members each comprising an inferior anchor-engaging end, the first superior rod-receiving end comprising a horizontally-aligned rod-receiving aperture, the second superior rod-receiving end comprising a vertically-aligned rod-receiving aperture, the inferior anchor-engaging ends each comprising a pin-engaging slot, each pin-engaging slot having a medial slot end and a lateral slot end, the first and second anchor structures each comprising a vertical pin-retaining structure and a horizontal container-engaging structure, the vertical pin-retaining structures each comprising a laterally-extending pivot pin, the horizontal container-engaging structures each comprising container-fastening means for fastening the first and second anchor structures to the inner container surface at the container bottom, the L-shaped liner-retaining rod comprising a linear first rod end and an angled second rod end, the second rod end being fixedly received in the vertically-aligned rod-receiving aperture, the first rod end for removable insertion into the horizontally-aligned rod-receiving aperture; and a liner roll, the liner roll comprising a first trash-receiving liner, a plurality of intermediate trash-receiving liners, and a last trash-receiving liner, the first trash-receiving liner comprising a roll beginning end and a first liner-engaging end, each intermediate trash receiving liner comprising an intermediate trash-receiving end and an intermediate liner-engaging end, the last trash-receiving liner comprising a last trash-receiving end and a roll terminus end, each intermediate trash-receiving end removably connected to a liner-engaging end, each intermediate liner-engaging end removably connected to a trash-receiving end, the first trash-receiving liner, the intermediate trash-receiving liners, and the last trash-receiving liner thus forming a continuously-furled liner length, the liner length comprising a plurality of perforated zones and a rod-receiving center, the last trash-receiving liner forming a rod-receiving tunnel at the rod-receiving center, the rod-receiving tunnel having a tunnel axis, the rod-receiving tunnel receiving the first rod end, the first rod end being removably inserted into the horizontally-aligned rod-receiving aperture, the laterally-extending pivot pins being located at the lateral slot ends, the container rim supporting the roll beginning end, the liner-retaining rod being spatially located to allow the liner roll to turn upon the liner-retaining rod about the tunnel axis, the trash-receiving container, the liner-dispensing assembly, and the liner roll thus forming a liner-dispensing trash receptacle system for use in combination with a motor vehicle.

33. In combination, a liner-dispensing trash receptacle system and a motor vehicle, the combination comprising:

a motor vehicle, the motor vehicle comprising a vehicular container-engaging surface, the vehicular container-engaging surface for receiving and stowing a liner-dispensing trash receptacle system, the liner-dispensing trash receptacle system comprising:

a trash-receiving container, the trash-receiving container comprising a container bottom, a container rim, an inner container surface, and an outer container surface, the inner container surface defining a superior matter-receiving volume, the outer container surface for engagement with the vehicular container-engaging surface;

a liner-dispensing assembly, the liner-dispensing assembly comprising first and second laterally spaced rod-retaining members, assembly anchoring means, and an L-shaped liner-retaining rod, the first rod-retaining member comprising a first superior rod-receiving end, the second rod-retaining member comprising a second superior rod-receiving end, the first and second rod-retaining members each comprising an inferior anchor-engaging end, the first superior rod-receiving end comprising a rod-receiving hook, the second superior rod-receiving end comprising a vertically-aligned rod-receiving aperture, the inferior anchor-engaging ends each comprising pivot attachment means, the pivot attachment means for enabling the first rod-retaining member to pivot about a latitudinally-aligned axis and the second rod-retaining member to pivot about a longitudinally-aligned axis, the assembly anchoring means for anchoring the first and second rod-retaining members to the inner container surface at the container bottom, the L-shaped liner-retaining rod comprising a linear first rod end and an angled second rod end, the second rod end being fixedly received in the vertically-aligned rod-receiving aperture, the first rod end for removable receipt by the rod-receiving hook; and a liner roll, the liner roll comprising a first trash-receiving liner, a plurality of intermediate trash-receiving liners, and a last trash-receiving liner, the first trash-receiving liner comprising a roll beginning end and a first liner-engaging end, each intermediate trash receiving liner comprising an intermediate trash-receiving end and an intermediate liner-engaging end, the last trash-receiving liner comprising a last trash-receiving end and a roll terminus end, each intermediate trash-receiving end removably connected to a liner-engaging end, each intermediate liner-engaging end removably connected to a trash-receiving end, the first trash-receiving liner, the intermediate trash-receiving liners, and the last trash-receiving liner thus forming a continuously-furled liner length, the liner length comprising a plurality of perforated zones and a rod-receiving center, the last trash-receiving liner forming a rod-receiving tunnel at the rod-receiving center, the rod-receiving tunnel having a tunnel axis, the rod-receiving tunnel receiving the first rod end, the first rod end being removably inserted into the horizontally-aligned rod-receiving aperture, the container rim supporting the roll beginning end, the liner-retaining rod being spatially located to allow the liner roll to turn upon the liner-retaining rod about the tunnel axis, the trash-receiving container, the liner-dispensing assembly, and the liner roll thus forming a liner-dispensing trash receptacle system for use in combination with a motor vehicle.

34. In combination, a motor vehicle and a liner-dispensing trash receptacle system, the combination comprising:

a motor vehicle, the motor vehicle comprising at least one vehicular seat, the vehicular seat comprising a headrest, an anterior seat surface, and a posterior seat surface, the vehicular seat for receiving and stowing a liner-dispensing trash receptacle system, the liner-dispensing trash receptacle system comprising:

a trash-receiving container, the trash-receiving container being formed from an adaptable, pliant material, the trash-receiving container comprising a container bottom, a container rim, an inner container surface, a posterior outer container surface, an anterior outer container surface, a volume-dividing member, and divider attachment means, the divider attachment means for attaching the volume-dividing member to the inner container surface intermediate the container rim and the container bottom thus forming a superior matter-receiving compartment and an inferior matter-receiving compartment, the volume-dividing member comprising a superior divider surface, an inferior divider surface, and a matter-receiving aperture, the matter-receiving aperture extending from the superior divider surface to the inferior divider surface;

seat-engagement means, the seat-engagement means for juxtapositioning the trash-receiving container adjacent the posterior seat surface; and a liner roll, the liner roll being placed in the inferior matter-receiving compartment, the liner roll comprising a first trash-receiving liner, a plurality of intermediate trash-receiving liners, and a last trash-receiving liner, the first trash-receiving liner comprising a roll beginning end and a first liner-engaging end, each intermediate trash receiving liner comprising an intermediate trash-receiving end and an intermediate liner-engaging end, the last trash-receiving liner comprising a last trash-receiving end and a roll terminus end, each intermediate trash-receiving end removably connected to a liner-engaging end, each intermediate liner-engaging end removably connected to a trash-receiving end, the first trash-receiving liner, the intermediate trash-receiving liners, and the last trash-receiving liner thus forming a continuously-furled liner length, the liner length comprising a plurality of perforated zones, the roll beginning end being inserted through the matter-receiving aperture, the container rim supporting the roll beginning end, the trash-receiving container, the seat-engagement means, and the liner roll thus forming a liner-dispensing trash receptacle system for use in combination with a motor vehicle.

35. In combination, a motor vehicle and a liner-dispensing trash receptacle system, the combination comprising:

a motor vehicle, the motor vehicle comprising vehicular container-enclosing means, a vehicular dashboard console, a vehicular seat-based console, a vehicular stowage compartment, at least one driver seat, at least two laterally opposed vehicular seats, and at least one inner vehicle peripheral wall, the vehicular dashboard console being located forwardly adjacent the driver seat, the vehicular seat-based console being located intermediate the laterally opposed vehicular seats, the vehicular stowage compartment being located in the inner vehicle peripheral wall, the vehicular container-enclosing means for stowing a liner-dispensing trash receptacle system, the liner-dispensing trash receptacle system comprising:

a trash-receiving container, the trash-receiving container comprising a container bottom, a container rim, an inner container surface, an outer container surface, an anterior container wall, and a posterior container wall, the inner container surface defining a superior matter-receiving volume, the outer container surface defining an exterior matter-engaging volume, the exterior matter-engaging volume for removable engagement with the vehicular container-enclosing means;

a liner-dispensing assembly, the liner-dispensing assembly comprising first and second laterally spaced rod-retaining members, first and second anchor structures, and a liner-retaining rod, the first rod-retaining member comprising rod-receiving pivot means, the second rod-retaining member comprising rod-receiving removable attachment means, the first and second rod-retaining members each comprising anchor-engaging means, the first and second anchor structures each comprising container-fastening means for fastening the first and second anchor structures to the inner container surface adjacent the container bottom and a select container wall, the select container wall being selected from the group consisting of the anterior container wall and the posterior container wall, the liner-retaining rod comprising a first rod end and a second rod end, the first rod end being pivotally connected to the rod-receiving pivot means, the second rod end for removable attachment to the rod-receiving removable attachment means; and a liner roll, the liner roll comprising a first trash-receiving liner, a plurality of intermediate trash-receiving liners, and a last trash-receiving liner, the first trash-receiving liner comprising a roll beginning end and a first liner-engaging end, each intermediate trash receiving liner comprising an intermediate trash-receiving end and an intermediate liner-engaging end, the last trash-receiving liner comprising a last trash-receiving end and a roll terminus end, each intermediate trash-receiving end removably connected to a liner-engaging end, each intermediate liner-engaging end removably connected to a trash-receiving end, the first trash-receiving liner, the intermediate trash-receiving liners, and the last trash-receiving liner thus forming a continuously-furled liner length, the liner length comprising a plurality of perforated zones and a rod-receiving center, the last trash-receiving liner forming a rod-receiving tunnel at the rod-receiving center, the rod-receiving tunnel having a tunnel axis, the rod-receiving tunnel receiving the liner-retaining rod, the second rod end being removably attached to the rod-receiving removable attachment means, the container rim supporting the roll beginning end, the liner-retaining rod being spatially located to allow the liner roll to turn upon the liner-retaining rod about the tunnel axis, the trash-receiving container, the liner-dispensing assembly, and the liner roll thus forming a liner-dispensing trash receptacle system for use in combination with a motor vehicle.

36. The combination of claim 35 wherein the vehicular container-enclosing means is defined by an enclosable container-retaining assembly, the enclosable container-retaining assembly comprising a container housing and a movable container-retaining cart, the container housing comprising a select vehicular compartment, the select vehicular compartment being selected from the group consisting of the vehicular dashboard console, the vehicular seat-based console, and the vehicular stowage compartment, the container housing comprising a cart track and a movable door, the movable container-retaining cart comprising track-engaging means and container-retaining structure, the container-retaining structure being fixedly mounted to the track-engaging means, the container-retaining structure being sized and shaped to removably engage the exterior matter-engaging volume, the container-retaining structure removably engaging the trash-receiving container, the track-engaging means engaging the cart track, the container housing being sized and shaped to house the container-retaining cart and the liner-dispensing trash receptacle system, the container-retaining cart and liner-dispensing trash receptacle system being housed in the select vehicular compartment, the movable door enclosing the container-retaining cart and liner-dispensing trash receptacle system within the container housing thus stowing the liner-dispensing trash receptacle system.

37. A liner-dispensing trash receptacle system for cooperative association with a container-engaging surface, the liner-dispensing trash receptacle system comprising:
  a trash-receiving container, the trash-receiving container comprising a container bottom, a container rim, an inner container surface, and an outer container surface, the inner container surface defining a superior matter-receiving volume, the outer container surface cooperatively associated with a container-engaging surface; and
  a liner-dispensing assembly, the liner-dispensing assembly comprising first and second laterally spaced rod-retaining members, first and second anchor structures, and a liner-retaining rod, the first and second rod-retaining members each comprising a superior rod-receiving end and an inferior anchor-engaging end, the superior rod-receiving ends each comprising rod-receiving means, the inferior anchor-engaging ends each being pivotally connected to the first and second anchor structures, the first and second anchor structures each comprising container-fastening means, the container-fastening means anchoring the first and second anchor structures to the inner container surface, the liner-retaining rod comprising first and second rod ends, the first and second rod ends being selectively received by the rod-receiving means.

38. The liner-dispensing trash receptacle system of claim 37 wherein the liner-dispensing trash receptacle system comprises a liner roll, the liner roll comprising a continuously-furled liner length, the liner length comprising a plurality of perforated zones and a rod-receiving center, the rod-receiving center receiving the liner-retaining rod, the container rim for supporting the roll beginning end, the liner-retaining rod being spatially located to allow the liner roll to turn upon the liner-retaining rod about an axis extending through the rod-receiving center, the trash-receiving container, the liner-dispensing assembly, and the liner roll thus forming a liner-dispensing trash receptacle system for cooperative association with the container-engaging surface.

39. The liner-dispensing trash receptacle system of claim 38 wherein the container-fastening means for anchoring the first and second anchor structures to the inner container surface is defined by select fastening structure, the select fastening structure being selected from the group consisting of a nut and bolt fastening assembly, a hook and loop fastening assembly, and a suction cup fastening assembly.

40. A liner-dispensing trash receptacle system for removable engagement with vehicular container-retaining means, the vehicular container-retaining means for stowing the liner-dispensing trash receptacle system, the liner-dispensing trash receptacle system comprising:
  a trash-receiving container, the trash-receiving container comprising a container bottom, a container rim, an inner container surface, an outer container surface, an anterior container wall, and a posterior container wall, the inner container surface defining a superior matter-receiving volume, the outer container surface defining an exterior matter-engaging volume, the exterior matter-engaging volume for removable engagement with vehicular container-retaining means, the vehicular container-retaining means for stowing the liner-dispensing trash receptacle system; and
  a liner-dispensing assembly, the liner-dispensing assembly comprising laterally spaced rod-retaining means, and a liner retaining rod, the rod-retaining means comprising rod-receiving pivot means, rod-receiving removable attachment means, and container-fastening means, the container-fastening means for fastening the rod-retaining means to the inner container surface adjacent the container bottom and a select container wall, the select container wall being selected from the group consisting of the anterior container wall and the posterior container wall, the liner-retaining rod comprising a first rod end and a second rod end, the first rod end being pivotally connected to the rod-receiving pivot means, the second rod end for removable attachment to the rod-receiving removable attachment means.

41. The liner-dispensing trash receptacle system of claim 40 wherein the liner-dispensing trash receptacle system comprises a liner roll, the liner roll comprising a continuously-furled liner length, the liner length comprising a plurality of perforated zones and a rod-receiving center, the rod-receiving center receiving the liner-retaining rod, the second rod end being removably attached to the rod-receiving removable attachment means, the container rim supporting the roll beginning end, the liner-retaining rod being spatially located to allow the liner roll to turn upon the liner-retaining rod about an axis extending through the rod-receiving center, the trash-receiving container, the liner-dispensing assembly, and the liner roll thus forming a liner-dispensing trash receptacle system for removable engagement with vehicular container-retaining means, the vehicular container-retaining means for stowing the liner-dispensing trash receptacle system.

42. The liner-dispensing trash receptacle system of claim 40 wherein the vehicular container-retaining means is defined by an enclosable container-retaining assembly, the enclosable container-retaining assembly comprising a container housing and a movable container-retaining cart, the container housing comprising a select vehicular compartment, the select vehicular compartment being selected from the group consisting of a vehicular dashboard console, a vehicular seat-based console, and a vehicular stowage compartment, the container housing comprising a cart track and a movable door, the movable container-retaining cart comprising track-engaging means and container-retaining structure, the container-retaining structure being fixedly mounted to the track-engaging means, the container-retaining structure being sized and shaped to removably engage the exterior matter-engaging volume, the container-retaining structure removably engaging the trash-receiving container, the track-engaging means engaging the cart track, the container housing being sized and shaped to house the container-retaining cart and the liner-dispensing trash receptacle system, the container-retaining cart and liner-dispensing trash receptacle system being housed in the select vehicular compartment, the movable door enclosing the container-retaining cart and liner-dispensing trash receptacle system within the container housing thus stowing the liner-dispensing trash receptacle system.

43. The liner-dispensing trash receptacle system of claim 42 wherein the track-engaging means is defined by a container-supporting platform and roller means for movement, the container-supporting platform comprising a superior platform surface and an inferior platform surface, the roller means for movement fixedly attached to the inferior platform surface, the container-retaining structure being fixedly attached to the superior platform surface, the cart track rollably receiving the roller means for movement.

44. The liner-dispensing trash receptacle system of claim 42 wherein the container-retaining structure is defined by a retention frame, the retention frame being formed from a constructed from an adaptable material, the retention frame comprising at least one anterior upright member, at least one posterior upright member, and platform-engaging means, the anterior upright member removably engaging the anterior container wall and the first and second container side walls, the posterior upright member removably engaging the posterior container wall and the first and second container side walls, the platform-engaging means fixedly attached to the superior platform surface.

45. The liner-dispensing trash receptacle system of claim 40 wherein the liner-retaining rod comprises a male rod portion and a female rod portion, the male rod portion comprising a first male rod end and a second male rod end, the first male rod end comprising a compression coil, the first male rod end telescopically received in the female rod portion, the compression coil engaging the male rod portion and the female rod portion, the second male rod end coinciding with the second rod end.

46. The liner-dispensing trash receptacle system of claim 40 wherein the liner-retaining rod is spatially located a select distance from the select container wall and the container bottom, the select distance being sufficient to enable a user to snugly wedge a plurality of liners between the liner-retaining rod and the select container wall and container bottom.

47. A liner-dispensing trash receptacle system for juxtaposition adjacent a substantially vertical container-engaging surface, the liner-dispensing trash receptacle comprising:

a trash-receiving container, the trash-receiving container being constructed from an adaptable, pliant material, the trash-receiving container comprising a container bottom, a container rim, an inner container surface, a posterior outer container surface, an anterior outer container surface, a volume-dividing member, and divider attachment means, the divider attachment means for attaching the volume-dividing member to the inner container surface intermediate the container rim and the container bottom thus forming a superior matter-receiving compartment and an inferior matter-receiving compartment, the volume-dividing member comprising a superior divider surface, an inferior divider surface, and a matter-receiving aperture, the matter-receiving aperture extending from the superior divider surface to the inferior divider surface, the anterior outer container surface comprising a matter-receiving pocket, the matter-receiving pocket being constructed from an adaptable, pliant material; and vertical member attachment means, the vertical member attachment means attaching the trash-receiving container to a vertical member, the vertical member comprising a container-engaging surface and a superior located member, the posterior outer container surface being adjacent the container-engaging surface.

* * * * *